(12) United States Patent
Lee et al.

(10) Patent No.: US 11,923,692 B2
(45) Date of Patent: Mar. 5, 2024

(54) WIRELESS POWER TRANSMISSION DEVICE AND OPERATING METHOD THEREFOR

(71) Applicant: SAMSUNG ELECTRONICS CO., LTD., Suwon-si (KR)

(72) Inventors: Chongmin Lee, Suwon-si (KR);
Jaeseok Park, Suwon-si (KR);
Hyoseok Han, Suwon-si (KR);
Sangwook Lee, Suwon-si (KR);
Seunghyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 17/366,994

(22) Filed: Jul. 2, 2021

(65) Prior Publication Data

US 2021/0336489 A1 Oct. 28, 2021

Related U.S. Application Data

(63) Continuation of application No. PCT/KR2019/018489, filed on Dec. 26, 2019.

(30) Foreign Application Priority Data

Jan. 4, 2019 (KR) .................. 10-2019-0000985

(51) Int. Cl.
*H02J 50/20* (2016.01)
*H02J 50/40* (2016.01)
(Continued)

(52) U.S. Cl.
CPC ............ *H02J 50/20* (2016.02); *H02J 50/402* (2020.01); *H02J 50/80* (2016.02); *H04B 1/40* (2013.01)

(58) Field of Classification Search
CPC .. H02J 50/20; H02J 50/23; H02J 50/80; H02J 50/402; H02J 50/40
See application file for complete search history.

(56) References Cited

U.S. PATENT DOCUMENTS

2010/0225173 A1* 9/2010 Aoyama ............... H02J 7/0049
320/108
2012/0086283 A1* 4/2012 Yamamoto ............ H02J 50/402
307/104
(Continued)

FOREIGN PATENT DOCUMENTS

KR 10-2017-0093187 8/2017
KR 10-2018-0031188 3/2018
(Continued)

OTHER PUBLICATIONS

International Search Report for PCT/KR2019/018489 dated Apr. 8, 2020, 22 pages.
(Continued)

*Primary Examiner* — Rexford N Barnie
*Assistant Examiner* — Rasem Mourad
(74) *Attorney, Agent, or Firm* — Nixon & Vanderhye, P.C.

(57) ABSTRACT

Provided are a wireless power transmission device and an operating method therefor, the device confirming an optimum phase adjustment degree for each antenna by applying a reference signal to at least one from among a plurality of patch antennas and sequentially applying a plurality of phase electric signals to each of the remaining antennas, when an RF wave is formed using electric signals from a plurality of power sources.

18 Claims, 18 Drawing Sheets

(51) Int. Cl.
  *H02J 50/80* (2016.01)
  *H04B 1/40* (2015.01)

(56) References Cited

U.S. PATENT DOCUMENTS

| | | |
|---|---|---|
| 2016/0156388 A1 | 6/2016 | Zeine et al. |
| 2017/0110909 A1 | 4/2017 | Zeine et al. |
| 2017/0331330 A1* | 11/2017 | Yeo .......................... H01Q 3/36 |
| 2018/0241255 A1* | 8/2018 | Leabman ............. H04B 5/0037 |
| 2019/0372399 A1 | 12/2019 | Park |
| 2019/0393729 A1* | 12/2019 | Contopanagos ...... H02J 50/005 |

FOREIGN PATENT DOCUMENTS

| | | |
|---|---|---|
| KR | 10-2018-0107012 | 10/2018 |
| KR | 10-2018-0124783 | 11/2018 |
| WO | 2012/046452 | 4/2012 |
| WO | 2015/077730 | 5/2015 |
| WO | 2016/109316 | 7/2016 |

OTHER PUBLICATIONS

Office Action dated Dec. 28, 2023 in counterpart Korean Patent Application No. 10-2019-0000985 and English-language translation.

\* cited by examiner

WIRELESS POWER TRANSMISSION DEVICE AND OPERATING METHOD THEREFOR

CROSS-REFERENCE TO RELATED APPLICATION

This application is a continuation of PCT/KR2019/018489, filed on Dec. 26, 2019 in the Korean Intellectual Property Office, claiming priority to Korean Patent Application No. 10-2019-0000985, filed Jan. 4, 2019 the disclosures of which are incorporated by reference herein in their entireties.

FIELD

The disclosure relates to a wireless power transmission device and a method for operating the same.

DESCRIPTION OF RELATED ART

Portable digital communication devices have become indispensable to many modern-day people. Consumers want to receive various high-quality services they need at any time and place. Furthermore, recent Internet-of-Things (IoT) technologies have combined various sensors, home appliances, and communication devices in daily lives into a single network. Wireless power transmission systems are necessary to facilitate operations of various sensors described above.

Wireless power transmission is classified into magnetic induction, magnetic resonance, and electromagnetic wave types. The magnetic induction or magnetic resonance type is advantageous to charging electronic devices positioned at relatively short distances. The electromagnetic wave type is more advantageous to long-distance (for example, multiple meters) power transmission than the magnetic induction or magnetic resonance type. The electromagnetic wave type is commonly used for long-distance power transmission, and can transmit power most efficiently by recognizing the accurate position of a power receiver at a long distance.

A wireless power transmission device configured to wirelessly transmit power according to the electromagnetic wave type may form a radio frequency (RF) wave, thereby wirelessly transmitting power. The wireless power transmission device may control at least one of the phase or amplitude of an electric signal that is input to each of multiple patch antennas such that a sub-RF wave formed by each of the multiple patch antennas is beam-formed at a specific point.

In order to accurately beam-form an RF wave, conventional wireless power transmission devices distribute an electronic signal from a single power source and apply the same to each patch antenna. If electric signals from multiple power sources are applied to a patch antenna, the electric signals from multiple power sources cannot be synchronized, and accurate beam forming is then impossible. Therefore, conventional wireless power transmission devices distribute an electric signal from a single power source.

In such a case, the wireless power transmission devices cannot connect an additional patch antenna later. In order to connect an additional path antenna, an additional power source is necessary to supply an electric signal to the additional patch antenna. However, an RF wave cannot be accurately beam-formed using electric signals from multiple power sources, as described above. This makes it difficult to implement a modular wireless power transmission device capable of increasing the number of patch antennas.

SUMMARY

Embodiments of the disclosure address the above-mentioned problems or other problems, and provide a wireless power transmission device and a method for operating the same, wherein when an RF wave is formed using electric signals from multiple power sources, a reference signal is applied to at least one of multiple patch antennas, and electrical signals having multiple phases are successively applied to the remaining antennas, respectively, thereby identifying the optimum phase adjustment degree for each antenna.

Embodiments of the disclosure may provide a wireless power transmission device which can be coupled to another wireless power transmission device, and a method for operating the same.

According to various example embodiments, a wireless power transmission device may include: a first power source; a plurality of first patch antennas; a first RF circuit configured to adjust at least one of a phase or an amplitude of each of a plurality of first electrical signals received from the first power source, and to output the plurality of first electrical signals of the adjusted phase or amplitude to the plurality of first patch antennas respectively; an interface comprising circuitry configured to transmit at least one of power or control data to another wireless power transmission device including a second power source, a second RF circuit, and a plurality of second patch antennas; a communication circuit configured to communicate with an electronic device configured to wirelessly receive power; and a processor, wherein the processor is configured to: control the wireless power transmission device to transmit first control data to the other wireless power transmission device while controlling the first RF circuit, wherein the first control data is for the second RF circuit to adjust at least one of a phase or an amplitude of each of a plurality of second electrical signals received from the second power source based on the first control data; control the communication circuit to receive at least one communication signal from the electronic device configured to convert RF waves formed from the plurality of first patch antennas and the plurality of second patch antennas into electrical signals; identify a first optimum phase adjustment degree of the first RF circuit and a second optimum phase adjustment degree of the second RF circuit, based on information included in each of the at least one communication signal; and control the wireless power transmission device to transmit second control data to the other wireless power transmission device, while controlling the first RF circuit to control an input electrical signal to the first optimum phase adjustment degree wherein the second control data is for the second RF circuit to control an electrical signal input to the other wireless power transmission device to the second optimum phase adjustment degree.

According to various example embodiments, a method of operating a wireless power transmission device including a first power source, a plurality of first patch antennas, a first RF circuit connected to the first power source and the plurality of first patch antennas, a communication circuit, an interface, and a processor may include: detecting a connection with another wireless power transmission device including a second power source, a second RF circuit, and a plurality of second patch antennas through the interface; in response to detection of the connection, controlling the first RF circuit to adjust at least one of a phase or an amplitude of each of a plurality of first electrical signals received from the first power source, and output the plurality of first electrical signals of the adjusted phase or amplitude to the plurality of first patch antennas respectively; transmitting first control data for controlling of the second RF circuit to the other wireless power transmission device through the interface while controlling the first RF circuit, wherein the first control data is for the second RF circuit to adjust at least one of a phase or an amplitude of each of a plurality of second electrical signals received from the second power source, based on the first control data; controlling the communication circuit to receive at least one communication signal from the electronic device configured to convert RF waves, formed from the plurality of first patch antennas and the plurality of second patch antennas, into electrical signals; identifying a first optimum phase adjustment degree of the first RF circuit and a second optimum phase adjustment degree of the second RF circuit, based on information included in each of the at least one communication signal; and transmitting second control data to the second wireless power transmission device through the interface, while controlling the first RF circuit to control an input electrical signal to the first optimum phase adjustment degree, wherein the second control data is for the second RF circuit to control an electrical signal input to the other wireless power transmission device to the second optimum phase adjustment degree.

According to various example embodiments, a second wireless power transmission device which can be connected to a first wireless power transmission device including a first power source and a plurality of first patch antennas may include: a second power source; a plurality of second patch antennas; an RF circuit configured to adjust at least one of a phase or an amplitude of each of a plurality of first electrical signals received from the second power source, and to output the plurality of first electrical signals of the adjusted phase or amplitude to the plurality of second patch antennas respectively; and an interface comprising circuitry configured to receive at least one of power or control data from the first wireless power transmission device. The RF circuit may be configured to: during a first period, adjust at least one of a phase or an amplitude of each of a plurality of second electrical signals received from the second power source, based on first control data received from the first wireless power transmission device through the interface and output the plurality of second electrical signals of the adjusted phase or amplitude to the plurality of second patch antennas respectively; during a second period, adjust at least one of the phase or the amplitude of each of the plurality of second electrical signals received from the second power source, based on second control data received from the first wireless power transmission device through the interface and output the plurality of second electrical signals of the adjusted phase or amplitude to the plurality of second patch antennas respectively. The second control data may include an optimum phase adjustment degree corresponding to each of the plurality of second patch antennas identified by the first wireless power transmission device.

Various example embodiments may provide a wireless power transmission device and a method for operating the same, wherein when an RF wave is formed using electric signals from multiple power sources, a reference signal is applied to at least one of multiple patch antennas, and electric signals having multiple phases are successively applied to the remaining antennas, respectively, thereby identifying the optimum phase adjustment degree for each antenna. Moreover, various example embodiments may provide a wireless power transmission device which can be coupled to another wireless power transmission device, and a method for operating the same. Therefore, according to the user's needs, multiple wireless power transmission devices may be coupled or separated and operate accordingly.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
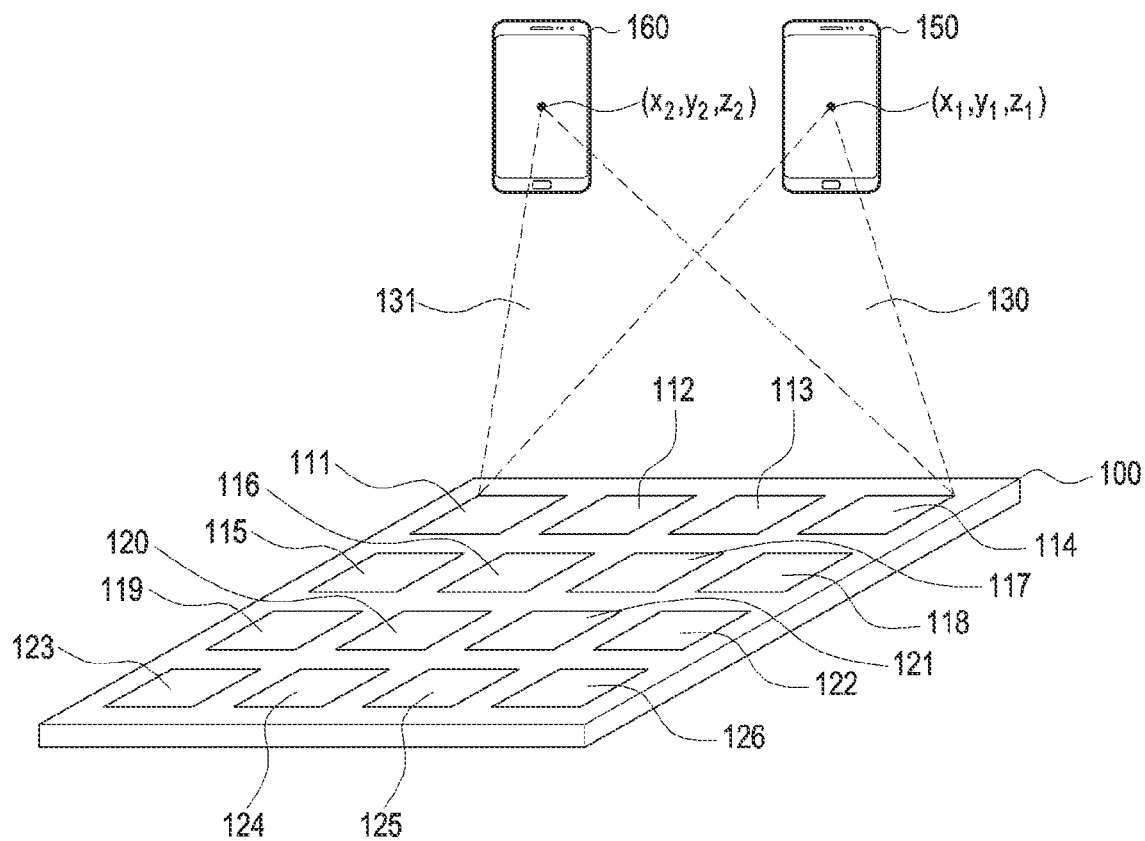
FIG. 1 is a diagram illustrating an example of a wireless power transmission system according to various embodiments.

FIG. 1 is a diagram illustrating an example of a wireless power transmission system according to various embodiments.

A wireless power transmission device 100 may wirelessly transmit power to at least one electronic device 150. In various embodiments, the wireless power transmission device 100 may include multiple patch antennas 111, 112, 113, 114, 115, 116, 117, 118, 119, 120, 212, 122, 123, 124, 125 and 126 (which may be referred to hereinafter as multiple patch antennas 111 to 126). There may be no restriction on multiple patch antennas 111 to 126 as long as the patch antennas are capable of generating RF waves, respectively. For example, the multiple patch antennas 111 to 126 may be implemented as multiple patch antennas arranged on the same plane as shown in FIG. 1, but may not be limited to the illustrated arrangement form, number, and type of antenna. The multiple patch-type antennas may be implemented in various arrangement forms and numbers, and may be implemented as multiple dipole antennas, multiple monopole antennas, and multiple parabolic antennas. At least one of amplitudes and phases of RF waves generated by the multiple patch antennas 111 to 126 may be adjusted by the wireless power transmission device 100. For ease of description, RF waves generated by the respective patch antennas 111 to 126 may be referred to as sub RF waves.

In various embodiments, the wireless power transmission device 100 may adjust at least one of an amplitude and a phase of each of the sub RF waves generated by the patch antennas 111 to 126. The sub RF waves may interfere with each other. For example, the sub-RF waves may constructively interfere with each other at one point, and the sub-RF waves may destructively interfere with each other at another point. The wireless power transmission device 100 according to various embodiments may adjust at least one of an amplitude and a phase of each of sub RF waves generated by the patch antennas 111 to 126 so that sub RF waves may constructively interfere with each other at a first point (x1, y1, z1).

For example, the wireless power transmission device 100 may determine that the electronic device 150 is disposed at the first point (x1, y1, z1). Here, the location of the electronic device 150 may be, for example, a point at which a power reception antenna of the electronic device 150 is located. A configuration in which the wireless power transmission device 100 determines the location of the electronic device 150 will be described in greater detail below. In order to allow the electronic device 150 to wirelessly receive power with a high transmission efficiency, sub-RF waves need to generate constructive interference at the first point (x1, y1, z1). Accordingly, the wireless power transmission device 100 may control the patch antennas 111 to 126 to enable the sub-RF waves to generate constructive interference at the first point (x1, y1, z1). Here, controlling the patch antennas 111 to 126 may denote controlling the magnitudes of signals input to the respective patch antennas 111 to 126 or controlling the phases (or delays) of signals input to the respective patch antennas 111 to 126. A person skilled in the art may easily understand beamforming which may refer, for example, to a technology for controlling RF waves to generate constructive interference at a predetermined point.

Additionally, a person skilled in the art may easily understand that the type of beamforming used in the disclosure is not limited. For example, various beamforming methods, such as methods disclosed in U.S. patent publication No. 2016/0099611, U.S. patent publication No. 2016/0099755, U.S. patent publication No. 2016/0100124, and the like, may be used. The form of RF waves formed by beamforming may be referred to as pockets of energy.

Accordingly, an RF wave 130 including sub-RF waves may have a maximum amplitude at the first point (x1, y1, z1) and, accordingly, the electronic device 150 may receive wireless power with a high efficiency. The wireless power transmission device 100 may sense that an electronic device 160 is disposed at a second point (x2, y2, z2). In order to charge the electronic device 160, the wireless power transmission device 100 may control the patch antennas 111 to 126 to enable the sub-RF waves to generate constructive interference at the second point (x2, y2, z2). Accordingly, an RF wave 131 including sub-RF waves may have a maximum amplitude at the second point (x2, y2, z2) and, accordingly, the electronic device 160 may receive wireless power with a high transmission efficiency.

For example, the electronic device 150 may be disposed relatively on the right side. Here, the wireless power transmission device 100 may apply a relatively higher delay to the sub-RF waves formed in connection with the patch antennas (e.g., 114, 118, 122, and 126) disposed relatively on the right side. That is, sub-RF waves may be generated from patch antennas (e.g., patch antennas 114, 118, 122, and 126) disposed relatively on the right side after a predetermined period of time has passed after generation of sub-RF waves, which are formed in connection with patch antennas (e.g., patch antennas 111, 115, 119, and 123) disposed relatively on the left side. Accordingly, the sub-RF waves may simultaneously meet at a point relatively on the right side. That is, the sub-RF waves may generate constructive interference at the point relatively on the right side. When beamforming is performed at a relatively center point, the wireless power transmission device 100 may apply substantially the same delay to the left side patch antennas (e.g., patch antennas 111, 115, 119, and 123) and the right side patch antennas (e.g., patch antennas 114, 118, 122, and 126). In addition, when beamforming is performed at a point relatively on the left side, the wireless power transmission device 100 may apply a higher delay to the left side patch antennas (e.g., patch antennas 111, 115, 119, and 123) than to the right side patch antennas (e.g., patch antennas 114, 118, 122, and 126). According to an embodiment, the wireless power transmission device 102 may oscillate the sub-RF waves of all the patch antennas 111 to 126 at substantially the same time, and may perform beamforming by adjusting a phase corresponding to the delay described above.

Figure 2:
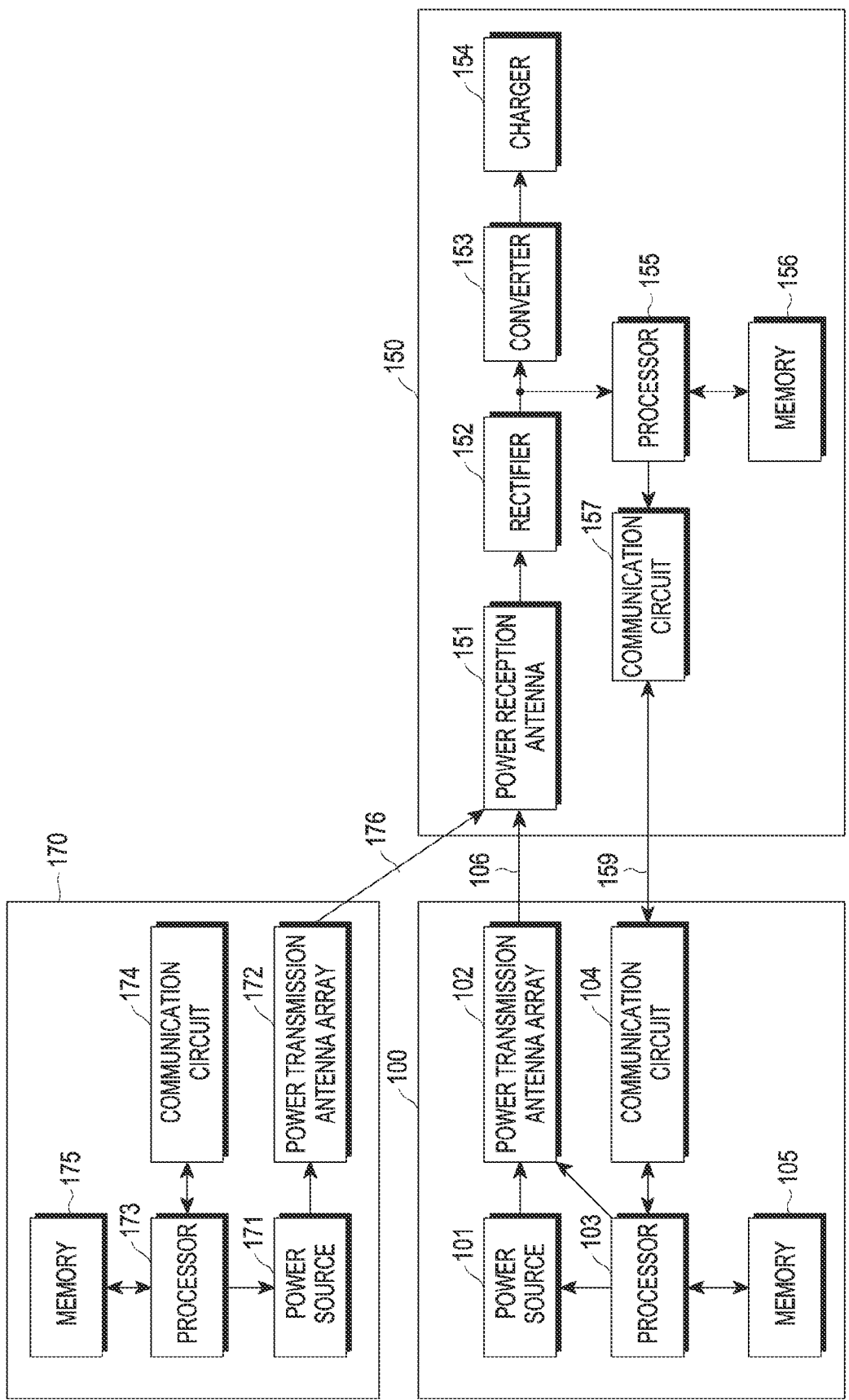
FIG. 2 is a block diagram illustrating an example configuration of a wireless power transmission device and an electronic device according to various embodiments.

FIG. 2 is a block diagram illustrating an example configuration of a wireless power transmission device and an electronic device according to various embodiments.

Referring to FIG. 2, the wireless power transmission device 100 may include a power source 101, a power transmission antenna array 102, a processor (e.g., including processing circuitry) 103, a communication circuit 104, and a memory 105. Referring to FIG. 2, there is no restriction for an electronic device 150 as long as the electronic device is capable of wirelessly receiving power, and the electronic device 150 may include a power reception antenna 151, a rectifier 152, a converter 153, and a charger 154, a processor (e.g., including processing circuitry) 155, a memory 156, and a communication circuit 157.

The power source 101 may provide an electrical signal for transmission to the power transmission antenna array 102. The power source 101 may be one of a source of an electrical signal of AC waveform or a source of an electrical signal of DC waveform. When the power source 101 is implemented as a source of an electrical signal of DC waveform, the wireless power transmission device 100 may further include an inverter (not shown), which converts DC power into AC power and transmits the converted AC power to the power transmission antenna array 102. Meanwhile, according to an embodiment, the power source 101 may provide AC power to the power transmission antenna array 102. The power transmission antenna array 102 may form a first RF wave 106 based on an electrical signal.

The power transmission antenna array 102 may include multiple patch antennas. For example, the multiple patch antennas 111 to 126 as shown in FIG. 1 may be included in the power transmission antenna array 102. There is no limitation on the number or arrangement form of the multiple patch antennas. The power transmission antenna array 102 may form an RF wave using power provided from the power source 101. The power transmission antenna array 102 may form an RF wave in a specific direction under the control of the processor 103. Here, forming an RF wave in a specific direction may denote controlling at least one of amplitudes and phases of the sub RF waves such that sub RF waves cause constructive interference at a point in a specific direction. For example, at least one of a phase shifter, an attenuator, or an amplifier may be connected between the power source 101 and the power transmission antenna array 102. For example, the phase shifter, the attenuator, and the amplifier may be connected to one patch antenna among multiple patch antennas of the power transmission antenna array 102, which will be described in more detail with reference to FIGS. 3A, 3B and 3C. Under the control of the processor 103, at least one of the phases or amplitudes of the electrical signals input to the multiple patch antennas, respectively, may be configured differently, and accordingly, the steering angle of RF waves formed in connection with the multiple patch antennas can be changed.

The processor 103 may include various processing circuitry and control the power transmission antenna array 102 to form an RF wave at a specific angle. The processor 103 may perform a process of identifying an optimum phase adjustment degree for each patch antenna, which will be described later in more detail. In the memory 105, a program (or an algorithm) for performing a process of identifying the optimum phase adjustment degree may be stored, and a process of identifying the optimum phase adjustment degree may be performed according to the execution of the stored program.

The processor 103 may identify an optimum phase adjustment degree for each of multiple patch antennas included in the power transmission antenna array 102. The processor 103 may control the phase shifter to adjust the phase of each of the electrical signals input to each of the multiple patch antennas using the determined optimum phase adjustment degree.

In various embodiments, the processor 103 may identify an optimum amplitude adjustment degree corresponding to each of multiple patch antennas. The processor 103 may control at least one of an attenuator or an amplifier to adjust the amplitude of each of electrical signals input to each of the multiple patch antennas. In various embodiments, the processor 103 may identify both an optimum phase adjustment degree and an optimum amplitude adjustment degree corresponding to each of the multiple patch antennas. The processor 103 may control at least one of the phase shifter, the attenuator, or the amplifier to adjust the phase and amplitude of each of the electrical signals input to each of the multiple patch antennas.

The processor 103 or the processor 155 may control, for example, at least one other element (e.g., hardware or software element) of the wireless power transmission device 100 or the electronic device 150 connected to the processor 103 or the processor 155 through execution of software, and may perform various data processing or computations. According to an embodiment, as at least a part of the data processing or computation, the processor 103 or the processor 155 may load, onto the memory 105 or memory 156, commands or data received from other elements (e.g., the communication circuit 104 or communication circuit 157), process the commands or data stored in the memory 105 or 156, and store result data, which is obtained by processing the commands or data, in the memory 105 or memory 156. According to an embodiment, the processor 103 or the processor 155 may include, for example, and without limitation, a main processor (e.g., a central processor or an application processor), and an auxiliary processor (e.g., a graphic processor, an image signal processor, a sensor hub processor, or a communication processor) that can be operated independently from or together with the main processor. The auxiliary processor may be configured to use lower power than that of the main processor, or to be specialized for a designated function. The auxiliary processor may be implemented separately from the main processor or as a part thereof. The processor 103 or the processor 155 may, for example, be implemented as a micro computing unit (MCU), a field programmable gate array (FPGA), or the like, according to the implementation.

The memory 105 or memory 156 may store various data used by at least one element (e.g., the processor 103 or processor 155) of the wireless power transmission device 100 or the electronic device 150. The data may include, for example, input data or output data about software and commands related thereto. The memory 105 or the memory 156 may include a volatile memory or a nonvolatile memory.

The communication circuit 104 may transmit or receive a communication signal 159 to or from the communication circuit 157. The communication signal 159 may include information relating to the reception strength of an RF wave (e.g., at least one of a voltage or current in at least one of an input terminal and an output terminal of the rectifier 152), identified by the electronic device 150. Alternatively, the communication signal 159 may include information on the optimum phase adjustment degree identified by the electronic device 150, which will be described in more detail later. The communication circuit 104 or communication circuit 157 may be manufactured based on various communication methods, such as wireless fidelity (Wi-Fi), Wi-Fi direct, Bluetooth, Zig-bee, near field communication (NFC), Bluetooth low energy (BLE), and the like, and there is no limitation on the type of communication method. Meanwhile, the communication signal 159 may include information on the rated power of the electronic device 150, and the processor 103 may determine whether to charge the electronic device 150 based on at least one of a unique identifier, a unique address, and rated power information of the electronic device 150.

In addition, the communication signal may be used in the processes, performed by the wireless power transmission device 100, of: identifying the electronic device 150; allowing power transmission to the electronic device 150; requesting reception power-related information from the electronic device 150; and receiving the reception power-related information from the electronic device 150. That is, the communication signal may be used in a subscription, command, or request process between the wireless power transmission device 100 and the electronic device 150.

There is no restriction for the power reception antenna 151 as long as the antenna is capable of receiving an RF wave. In addition, the power reception antenna 151 may also be implemented in the form of an array including multiple antennas. AC power received by the power reception antenna 151 may be rectified into DC power by the rectifier 152. The converter 153 may convert DC power into a required voltage and provide the converted power to the charger 154. The charger 154 may charge a battery (not shown). Although not shown, the converter 153 may provide the converted power to a power management integrated circuit (PMIC) (not shown), and the PMIC (not shown) may supply power to various hardware of the electronic device 150.

The communication circuit 157 may transmit, to the wireless power transmission device 100, information relating to the reception strength of an RF wave received by the electronic device 150, that is, a communication signal 159 including reception power-related information. The processor 155 may identify the optimum phase degree of the RF wave, and here, the processor may control the communication circuit 157 to transmit the communication signal 159 including information on the optimum phase degree of the RF wave. The memory 156 may store programs or algorithms capable of controlling various hardware of the electronic device 150.

The processor 155 may monitor a voltage of an output terminal of the rectifier 152. For example, the electronic device 150 may further include a voltmeter connected to the output terminal of the rectifier 152, and the processor 155 may receive a voltage value from the voltmeter and monitor the voltage at the output terminal of the rectifier 152. The processor 155 may provide information including a voltage value of the output terminal of the rectifier 152 to the communication circuit 157. The communication circuit 157 may transmit a communication signal including reception power-related information using a communication antenna (not shown). The reception power-related information may include information relating to the magnitude of the received power such as, for example, a voltage at the output terminal of the rectifier 152, and may include a value indicating the magnitude of a current at the output terminal of the rectifier 152. The electronic device 150 may further include a voltmeter or an ammeter capable of measuring the current at the output terminal of the rectifier 152, which will be easily understood by a person skilled in the art. The ammeter may be implemented in various forms, such as a DC ammeter, an AC ammeter, and a digital ammeter, and there is no restriction for the type of ammeter. The voltmeter may be implemented in various forms, such as an electro dynamic instrument voltmeter, an electrostatic voltmeter, and a digital voltmeter, and there is no restriction for the type of voltmeter. In addition, the reception power-related information is measurable at any point of the electronic device 150 as well as at the output terminal of the rectifier 152.

The processor 155 may calculate an optimum phase of a sub RF wave received from a wireless power transmission device. The processor may provide information relating to the calculated optimum phase to the communication circuit 157, and may transmit information relating to the optimum phase to the wireless power transmission device through the communication circuit 157 using a communication antenna (not shown). The wireless power transmission device may adjust the phase of an electrical signal input to a target antenna based on the received information relating to the optimum phase.

Another wireless power transmission device 170 may include a power source 171, a power transmission antenna array 172, a processor (e.g., including processing circuitry) 173, a communication circuit 174, and a memory 175. The other wireless power transmission device 170 may control at least one of a phase and an amplitude of each of electrical signals input to each of the multiple patch antennas of the power transmission antenna array 172. For example, the processor 173 of the other wireless power transmission device 170 may control at least one of one or more phase shifters, attenuators, or amplifiers. The power transmission antenna array 172 may form a second RF wave 176 based on an input electrical signal. For example, the wireless power transmission device 100 and the other wireless power transmission device 170 may be disposed adjacent to each other. Accordingly, the power reception antenna 151 may convert, into electrical signals, the first RF wave 106 from the wireless power transmission device 100 and the second RF wave 176 from the other wireless power transmission device 170, and use the same. The electronic device 150 may receive a larger magnitude of power at the time of receiving the RF waves 106 and 176 from two wireless power transmission devices 100 and 170 than that at the time of receiving the first RF wave 106 from one wireless power transmission device 100.

At least one of phases and amplitudes of electrical signals input to the multiple patch antennas of the power transmission antenna array 102 and the power transmission antenna array 172 needs to be controlled to enable beamforming of the first RF wave 106 and the second RF wave 176 to be performed to correspond to the location of the electronic device 150. However, there may be an error in synchronization of the power source 101 and the power source 171. Even if at least one of the processor 103 and the processor 173 acquires the accurate location of the electronic device 150, adjusting at least one of the phases and amplitudes of the electrical signals input to the respective patch antennas based on the location of the electronic device 150, in a state where the power source 101 and the power source 171 are not completely synchronized, may not ensure accurate beamforming.

The wireless power transmission device 100 and the other wireless power transmission device 170 according to various embodiments may configure (e.g., identify), as a reference antenna, at least one of multiple patch antennas of the power transmission antenna array 102 and the power transmission antenna array 172, and maintain application of an electrical signal to the reference antenna. The wireless power transmission device 100 and the other wireless power transmission device 170 may configure (e.g., identify), as a target antenna, one of multiple patch antennas of the power transmission antenna array 102 and the power transmission antenna array 172, and may sequentially apply electrical signals, for which multiple phase adjustment degrees are applied, to the target antenna. The wireless power transmission device 100 and the other wireless power transmission device 170 may identify the optimum phase adjustment degree corresponding to the target antenna based on information received from the electronic device 150. The wireless power transmission device 100 and the other wireless power transmission device 170 may change a target antenna to another antenna and identify an optimum phase adjustment degree for the changed target antenna. The wireless power transmission device 100 and the other wireless power transmission device 170 may identify the optimum phase adjustment degrees for the remaining antennas except for the reference antenna among the multiple patch antennas of the power transmission antenna array 102 and the power transmission antenna array 172. The wireless power transmission device 100 and the other wireless power transmission device 170 may control, based on the identified optimum phase adjustment degree, phases of electrical signals input to the multiple respective patch antennas of the power transmission antenna array 102 and the power transmission antenna array 172. Accordingly, even when the power source 101 and the power source 171 are not accurately synchronized, the electronic device 150 may perform highly efficient wireless charging.

The processor 173, the communication circuit 174, and the memory 175 may perform at least some of the same or similar operations as those of the processor 103, the communication circuit 104, and the memory 105 of the wireless power transmission device 100, respectively, or may be implemented, at least in part, in the same or similar manner Depending on the implementation, at least one of the processor 173, the communication circuit 174, or the memory 175 may not be included in the other wireless power transmission device 170 and here, the processor 103 of the wireless power transmission device 100 may control at least one of a phase and an amplitude of an electrical signal input to the power transmission antenna array 172. The wireless power transmission device 100 and the other wireless power transmission device 170 may be connected to each other and accordingly, the wireless power transmission device 100 may provide at least one of power or a control signal to the other wireless power transmission device 170.

Figure 3A:
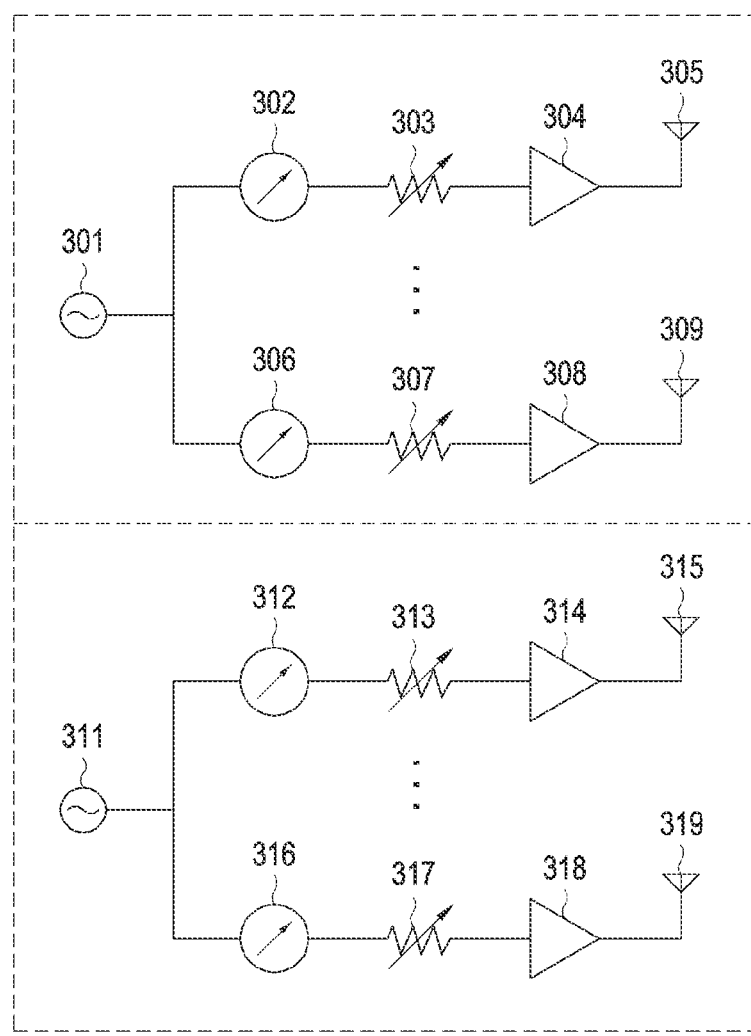
FIG. 3A is a diagram illustrating multiple power sources, control elements, and antennas according to various embodiments.

FIG. 3A is a diagram illustrating multiple power sources, control elements, and antennas according to various embodiments.

As shown in FIG. 3A, a first antenna 305 and a second antenna 309 may be connected to a first power source 301. A first phase shifter 302, a first attenuator 303, a first amplifier 304, and a first antenna 305 may be connected to the first power source 301. A second phase shifter 306, a second attenuator 307, a second amplifier 308, and a second antenna 309 may be connected to the first power source 301. In FIG. 3A, although two antennas 305 and 309 are illustrated as being connected to the first power source 301, this is only for ease of description, and there is no limitation to the number of antennas connected to the first power source 301. A third antenna 315 and a fourth antenna 319 may be connected to a second power source 311. A third phase shifter 312, a third attenuator 313, a third amplifier 314, and a third antenna 315 may be connected to the second power source 311. A fourth phase shifter 316, a fourth attenuator 317, a fourth amplifier 318, and a fourth antenna 319 may be connected to the second power source 311. In FIG. 3A, although two antennas 315 and 319 are illustrated as being connected to the second power source 311, this is only for ease of description, and there is no limitation to the number of antennas connected to the second power source 311. For example, the first power source 301 may be included in one wireless power transmission device, and the second power source 311 may be included in another wireless power transmission device. Alternatively, the first power source 301 and the second power source 311 may be implemented to be included in one wireless power transmission device.

The phase shifter 302, the phase shifter 306, the phase shifter 312, and the phase shifter 316 may adjust the phase of an input electrical signal under the control of the processor. For example, the phase adjustment degree of each of the phase shifter 302, the phase shifter 306, the phase shifter 312, and the phase shifter 316 may be identified by one processor, or may be identified by multiple processors depending on the implementation. The attenuator 303, the attenuator 307, the attenuator 313, and the attenuator 317 may change the amplitudes of the received electrical signal, and the degree of change may be controlled by one processor or multiple processors. The amplifier 304, the amplifier 308, the amplifier 312, and the amplifier 316 may change at least one of the amplitude or gain of the input electrical signal, and the degree of change may be controlled by one processor or multiple processors. Each of the amplifier 304, the amplifier 308, the amplifier 312, and the amplifier 316 may include at least one of a driver amplifier and a power amplifier.

According to various embodiments, at least one of the first antenna 305, the second antenna 309, the third antenna 315, and the fourth antenna 319 may be configured as a reference antenna, and a reference current may be applied to the reference antenna. One of the remaining antennas is determined as a target antenna, and electrical signals for which phase adjustments are performed differently from each other may be sequentially applied to the target antenna. For example, when the first antenna 305 is configured as a reference antenna and the third antenna 315 is configured as a target antenna, a reference current may be applied to the first antenna 305, and electrical signals for which phase adjustments are performed differently from each other may be sequentially applied to the third antenna 315. The wireless power transmission device 100 according to various embodiments may control a phase shifter to adjust a phase of an electrical signal input to a target antenna. For example, when an antenna included in another wireless power transmission device is configured as a target antenna, the processor 103 of the wireless power transmission device 100 may transfer a control signal for controlling the phase of the electrical signal input to the target antenna to another wireless power transmission device. The wireless power transmission device 100 may identify, for example, based on information received from the electronic device 150, an optimum phase adjustment degree corresponding to the target antenna. A detailed process of identifying the optimum phase adjustment degree will be described later in more detail. Accordingly, even when the power source 301 and the power source 311 are not synchronized, the electronic device 150 may wirelessly receive a relatively large magnitude of power.

Figure 3B:
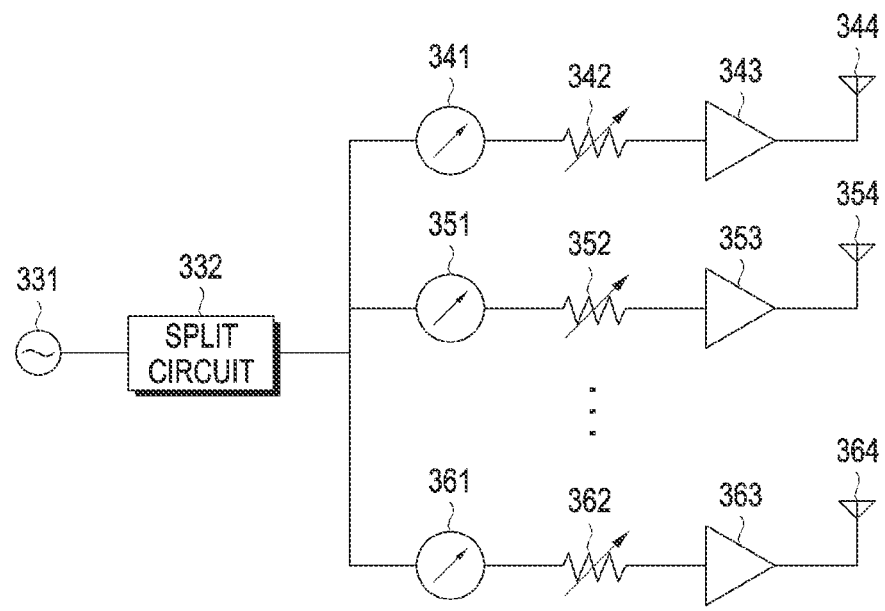
FIG. 3B is a diagram illustrating a single power source, control elements, and antennas according to a comparative example.

FIG. 3B is a diagram illustrating a single power source, control elements, and antennas according to a comparative example.

A wireless power transmission device according to a comparative example may include a single power source 331, a split circuit 332, a first phase shifter 341, a first attenuator 342, a first amplifier 343, and a first antenna 344, a second phase shifter 351, a second attenuator 352, a second amplifier 353, a second antenna 354, a third phase shifter 361, a third attenuator 362, a third amplifier 363, and a third antenna 364. The split circuit 332 may split an electrical signal output from the single power source 331 and transfer the split electrical signal to the first phase shifter 341, the second phase shifter 351, and the third phase shifter 361, respectively. Accordingly, synchronized electrical signals may be input to the first phase shifter 341, the second phase shifter 351, and the third phase shifter 361, and beamforming of the RF waves is performed through the first antenna 344, the second antenna 354, and the third antenna 364 according to the phase adjustment of the respective phase shifters. However, as described above, the wireless power transmission device according to the comparative example may not include an additional patch antenna.

Figure 3C:
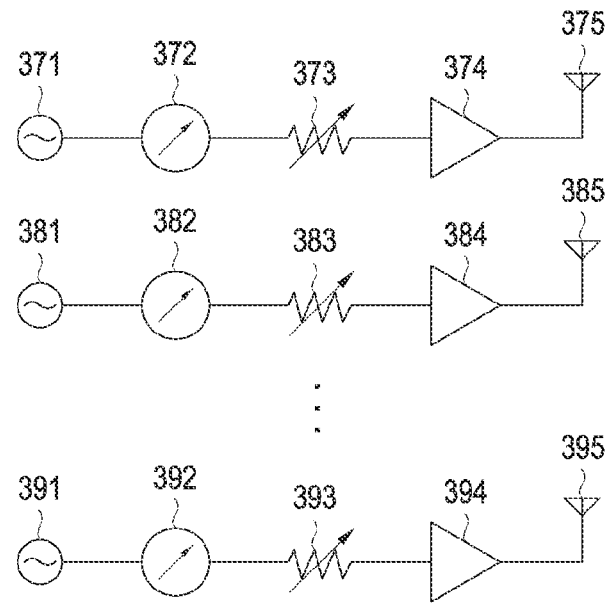
FIG. 3C is a diagram illustrating multiple power sources, control elements, and antennas according to various embodiments.

FIG. 3C is a diagram illustrating multiple power sources, control elements, and antennas according to various embodiments.

The wireless power transmission device 100 according to various embodiments may include a first power source 371, a second power source 381, a third power source 391, a first phase shifter 372, and a second phase shifter 382, a third phase shifter 392, a first attenuator 373, a second attenuator 383, a third attenuator 393, a first amplifier 374, a second amplifier 384, a third amplifier 394, a first antenna 375, a second antenna 385, and a third antenna 395.

According to various embodiments, at least one of the first antenna 375, the second antenna 385, and the third antenna 395 may be configured as a reference antenna, and a reference current may be applied to the reference antenna. One of the remaining antennas is determined as a target antenna, and electrical signals for which phase adjustments are performed differently from each other may be sequentially applied to the target antenna. For example, when the first antenna 375 is configured as a reference antenna and the third antenna 395 is configured as a target antenna, a reference current is applied to the first antenna 375 and electrical signals for which phase adjustments are performed differently from each other may be sequentially applied to the third antenna 395. The wireless power transmission device 100 according to various embodiments may control a phase shifter to adjust a phase of an electrical signal input to a target antenna. The wireless power transmission device 100 may identify, for example, based on information received from the electronic device 150, an optimum phase adjustment degree corresponding to the target antenna. A detailed process of identifying the optimum phase adjustment degree will be described in greater detail below. Accordingly, even when the power source 371, the power source 381, and the power source 391 are not synchronized, the electronic device 150 may wirelessly receive a relatively large magnitude of power.

According to various embodiments, one antenna set including, for example, a first power source 371, a first phase shifter 372, a first attenuator 373, a first amplifier 374, and a first antenna 375 may be implemented to be detachable from the wireless power transmission device 100.

Figure 4:
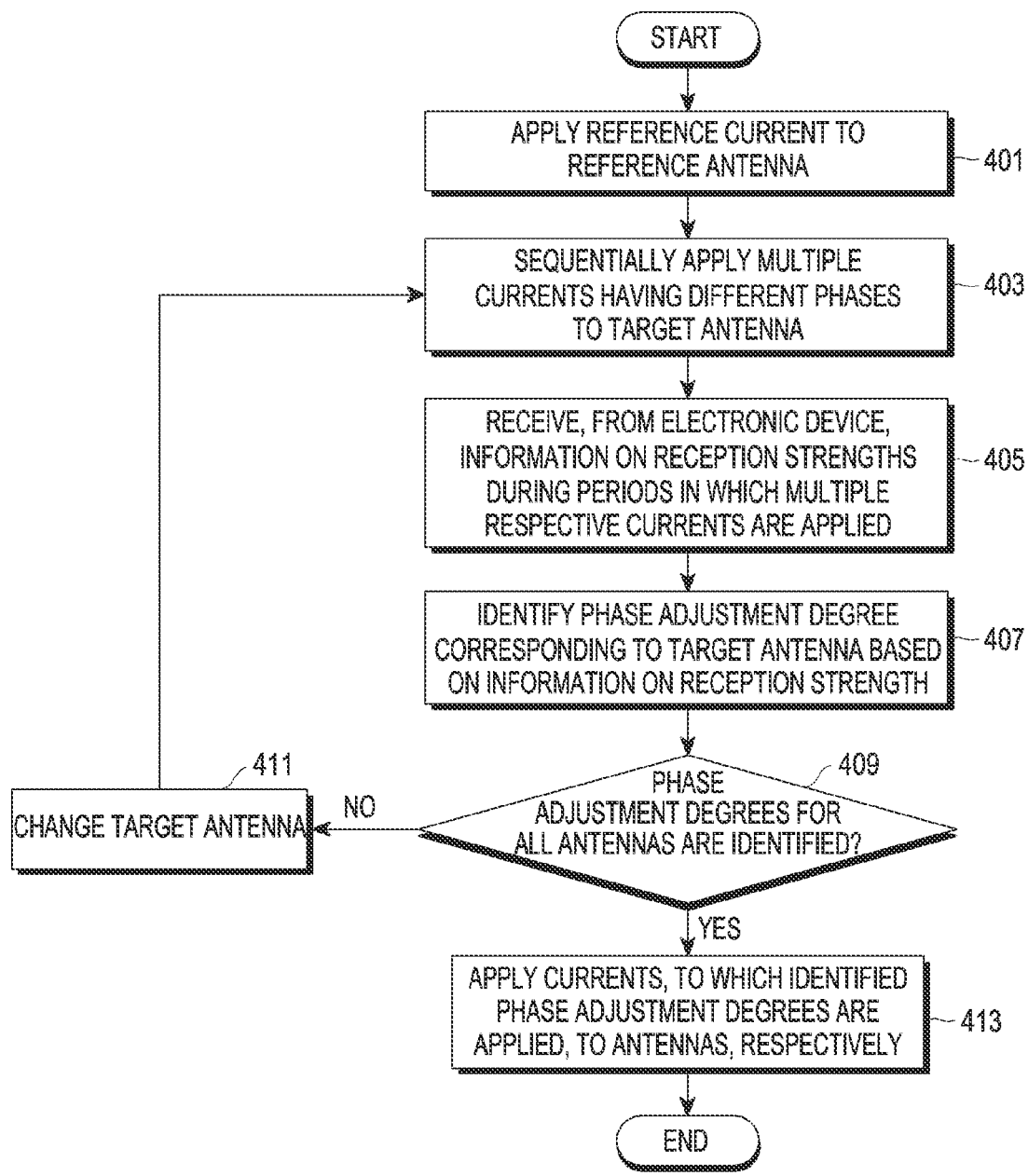
FIG. 4 is a flowchart illustrating an example method of operating a wireless power transmission device according to various embodiments.
Figure 5A:
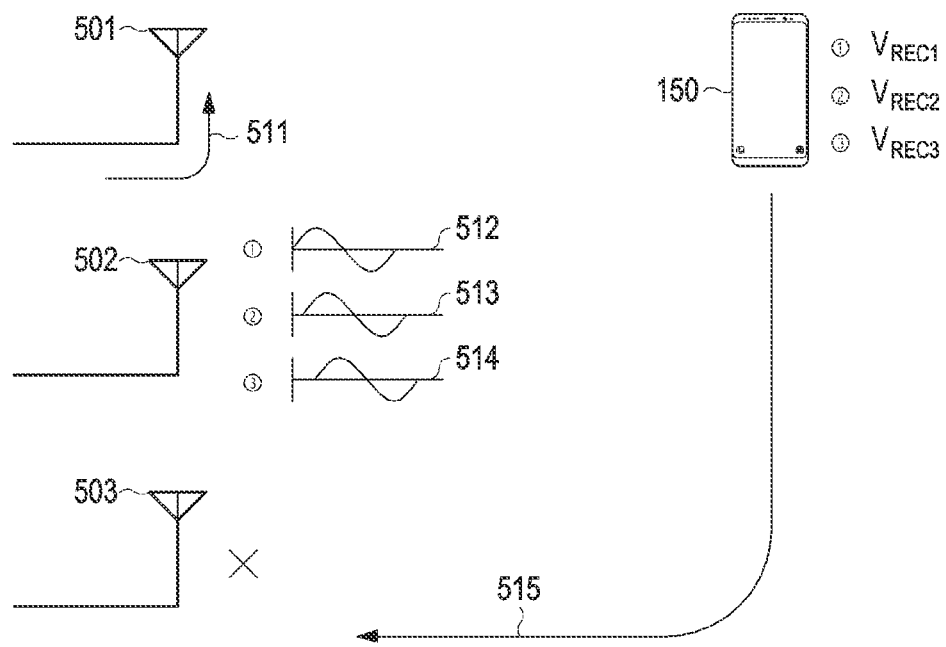
FIG. 5A is a diagram illustrating an antenna and an electronic device according to various embodiments.
Figure 5B:
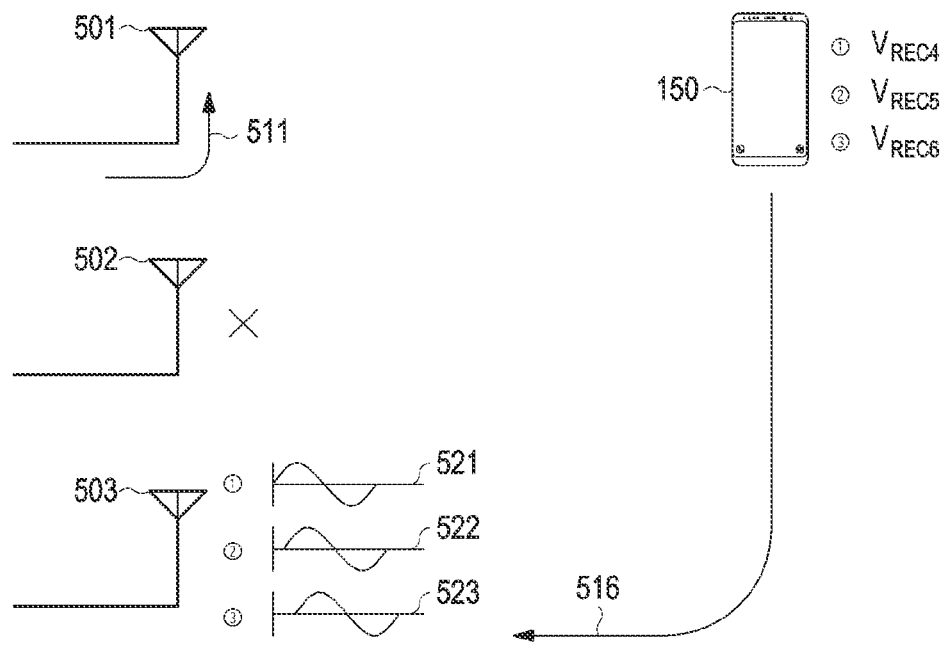
FIG. 5B is a diagram illustrating an antenna and an electronic device according to various embodiments.
Figure 6:
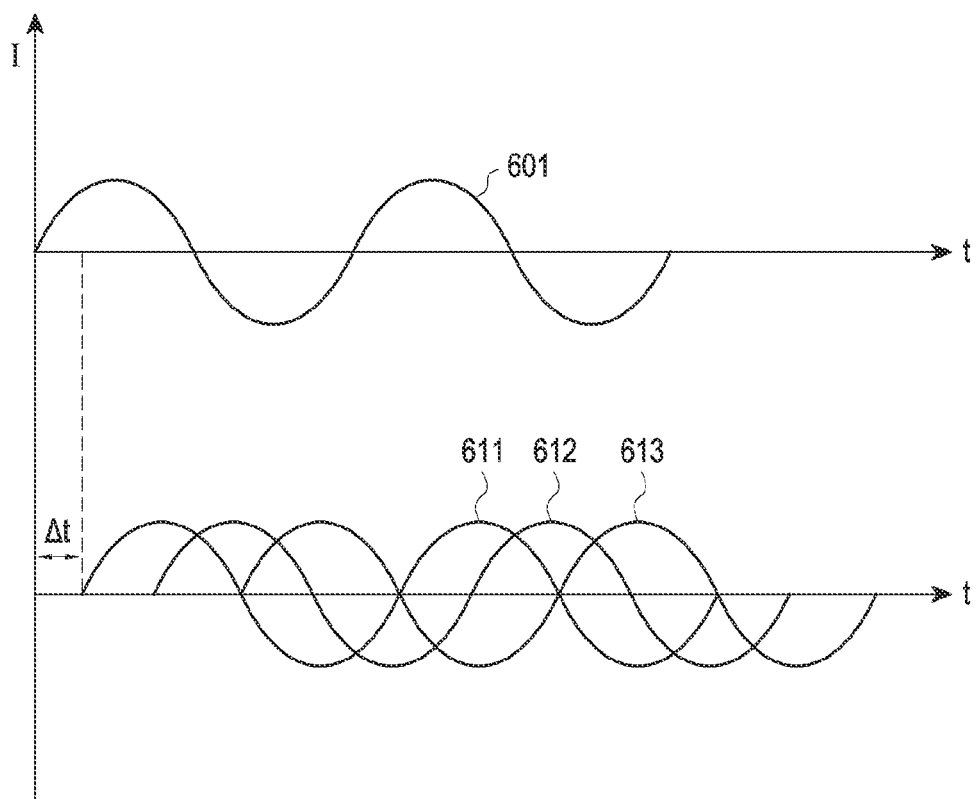
FIG. 6 is a diagram graphically illustrating electrical signals output from multiple power sources according to various embodiments.

FIG. 4 is a flowchart illustrating an example method of operating a wireless power transmission device according to various embodiments. The embodiment of FIG. 4 will be described in greater detail below with reference to FIGS. 5A, 5B and 6. FIGS. 5A and 5B are diagrams illustrating an antenna and an electronic device according to various embodiments. FIG. 6 is a diagram graphically illustrating electrical signals output from multiple power sources according to various embodiments.

According to various embodiments, the wireless power transmission device 100 may apply a reference current to a reference antenna in operation 401. Herein, performing a specific operation by the wireless power transmission device 100 may denote performing a specific operation by the processor 103 included in the wireless power transmission device 100 or controlling, by the processor 103, another hardware to perform a specific operation. Performing a specific operation by the wireless power transmission device may denote performing a specific operation by the processor 103 according to the execution of instructions stored in the memory 105, or causing another hardware to perform a specific operation. For example, as shown in FIG. 5A, the wireless power transmission device 100 may include a first antenna 501, a second antenna 502, and a third antenna 503. The wireless power transmission device 100 may configure (e.g., identify) the first antenna 501 to be a reference antenna. The wireless power transmission device 100 may apply a reference current 511 to the first antenna 501 that is a reference antenna.

In operation 403, the wireless power transmission device 100 may sequentially apply multiple currents having different phases to a target antenna. For example, the wireless power transmission device 100 may configure (e.g., identify) the second antenna 502 in FIG. 5A to be a target antenna. The wireless power transmission device 100 may apply the first current 512 to the second antenna 502, which is the target antenna, during a first period of time. During the first period of time, an RF wave from the first antenna 501 that is a reference antenna and an RF wave from the second antenna 502 that is a target antenna may be formed around the electronic device 150, and both RF waves may interfere with each other. The electronic device 150 may measure the strength of wirelessly received power. For example, the electronic device 150 may measure a voltage at the output terminal of the rectifier 152. The electronic device 150 may measure a first rectified voltage value $V_{REC1}$ during the first period of time.

In addition, the wireless power transmission device 100 may apply the second current 513 to the second antenna 502 that is the target antenna during a second period of time. The second current 513 may have a phase different from that of the first current 512. The wireless power transmission device 100 may control the phase adjustment degree of a phase shifter connected to the second antenna 502 to apply the second current 513, having a phase different from that of the first current 512, to the second antenna 502. During the second period of time, an RF wave from the first antenna 501 that is a reference antenna and an RF wave from the second antenna 502 that is a target antenna may be formed around the electronic device 150, and both RF waves may interfere with each other. Since the second current 513 applied to the second antenna 502 has a phase different from that of the first current 512, the waveform of RF waves generating interference at the location of the electronic device 150 may differ from the waveform of RF waves generating interference at the location of the electronic device 150 during the first period of time. The electronic device 150 may measure the strength of wirelessly received power. For example, the electronic device 150 may measure a voltage at the output terminal of the rectifier 152. The electronic device 150 may measure a second rectified voltage value $V_{REC2}$ during the second period of time, and the second rectified voltage value $V_{REC2}$ may differ from the first rectified voltage value $V_{REC1}$.

In addition, the wireless power transmission device 100 may apply a third current 514 to the second antenna 502, which is a target antenna, during a third period of time. The third current 514 may have a phase different from that of the first current 512 and the second current 513. The wireless power transmission device 100 may control the phase adjustment degree of a phase shifter connected to the second antenna 502, to apply the third current 514 having a phase different from that of the first current 512 and the second current 513 to the second antenna 502. During the third period of time, an RF wave from the first antenna 501 that is a reference antenna and an RF wave from the second antenna 502 that is a target antenna may be formed around the electronic device 150, and both RF waves may interfere with each other. Since the third current 514 applied to the second antenna 502 has a phase different from that of the first current 512 and the second current 513, the waveform of RF waves generating interference at the location of the electronic device 150 may differ from the waveform of RF waves generating interference at the location of the electronic device 150 during the first period of time and the second period of time. The electronic device 150 may measure the strength of wirelessly received power. For example, the electronic device 150 may measure a voltage at the output terminal of the rectifier 152. The electronic device 150 may measure a third rectified voltage value $V_{REC3}$ for a third period of time, and the third rectified voltage value $V_{REC3}$ may differ from the first rectified voltage value $V_{REC1}$ and second rectified voltage value $V_{REC2}$.

In operation 405, the wireless power transmission device 100 may receive, from the electronic device 150, information on reception strengths during periods in which multiple respective currents are applied. For example, the electronic device 150 may wirelessly transmit, to the wireless power transmission device 100, a communication signal 515 including the first rectified voltage value $V_{REC1}$, a second rectified voltage value $V_{REC2}$, and a third rectified voltage value $V_{REC3}$. The electronic device 150 may transmit one communication signal including all of the first rectified voltage value $V_{REC1}$, the second rectified voltage value $V_{REC2}$, and the third rectified voltage value $V_{REC3}$ to the wireless power transmission device 100. Alternatively, the electronic device 150 may include the first rectified voltage value $V_{REC1}$, the second rectified voltage value $V_{REC2}$, and the third rectified voltage value $V_{REC3}$ in the multiple respective communication signals, and transmit the same to the wireless power transmission device 100. Accordingly, the wireless power transmission device 100 may identify information on the strength of power received by the electronic device 150 during each of the first to third periods of time.

In operation 407, the wireless power transmission device 100 may identify the phase adjustment degree corresponding to the target antenna based on the information on the reception strength. For example, the wireless power transmission device 100 may identify that the second rectified voltage value $V_{REC2}$ has the largest value, and in response thereto, may identify that a phase adjustment degree of the second current 513 is a phase adjustment degree corresponding to the second antenna 502 that is the target antenna. Alternatively, the wireless power transmission device 100 may configure the phase adjustment degree in one dimension, and configure the reception strength of the electronic device 150 in one dimension. The wireless power transmission device 100 may interpolate the received information, and may identify a phase adjustment degree corresponding to the maximum value of the reception strength according to a result of interpolation.

In operation 409, the wireless power transmission device 100 may identify whether the phase adjustment degrees for all antennas have been identified. If the phase adjustment degrees have not been identified for all antennas ("No" in operation 409), the wireless power transmission device 100 may change the target antenna in operation 411. For example, as shown in FIG. 5B, the wireless power transmission device 100 may change the target antenna to the third antenna 503. The wireless power transmission device 100 may apply the fourth current 521, the fifth current 522, and the sixth current 523 to the third antenna 503, which is a changed target antenna, during a fourth period of time, a fifth period of time, and a sixth period of time, respectively. As described above, phase adjustment degrees of phase shifters connected to the third antenna 503 are differently controlled, and thus the fourth current 521, the fifth current 522, and the sixth current 523 may have different phases with each other. The electronic device 150 may identify the strength of the wirelessly received power during the fourth period of time, the fifth period of time, and the sixth period of time. For example, the electronic device 150 may identify a fourth rectified voltage value $V_{REC4}$, a fifth rectified voltage value $V_{REC5}$, and a sixth rectified voltage value $V_{REC6}$ during a fourth period of time, a fifth period of time, and a sixth period of time, respectively. The electronic device 150 may transmit a communication signal 516 including information on the strength of wirelessly received power to the wireless power transmission device 100. The wireless power transmission device 100 may identify a phase adjustment degree corresponding to the third antenna 503 based on the received information. The wireless power transmission device 100 may identify the phase adjustment degrees for all antennas.

If the phase adjustment degrees have not been identified for all antennas ("Yes" in operation 409), the wireless power transmission device 100 may apply currents, to which the identified phase adjustment degrees are applied, to the antennas, respectively in operation 413.

Accordingly, even if two or more power sources are connected to the first antenna 501, the second antenna 502, and the third antenna 503, the electronic device 150 may wirelessly receive a large magnitude of power. For example, as shown in FIG. 6, a reference current 601 from a first power source may be applied to a first antenna 501 that is a reference antenna. Meanwhile, a current from the second power source may be applied to the third antenna 501. Accordingly, even if the phase adjustment degree of the reference current 601 is configured to be 0 and the phase adjustment degree of the current applied to the third antenna 501 is configured to be 0, a time difference Δt may exist therebetween. As described above, the wireless power transmission device 100 may sequentially apply a current 611, a current 612, and a current 613 having different phases to the third antenna 501. The wireless power transmission device 100 may identify information on the strength of power received by the electronic device 150 to identify the phase adjustment degree corresponding to the third antenna 503. Accordingly, as shown in FIG. 6, even if multiple power sources are not synchronized, the electronic device 150 may receive a relatively large magnitude of power.

Figure 7:
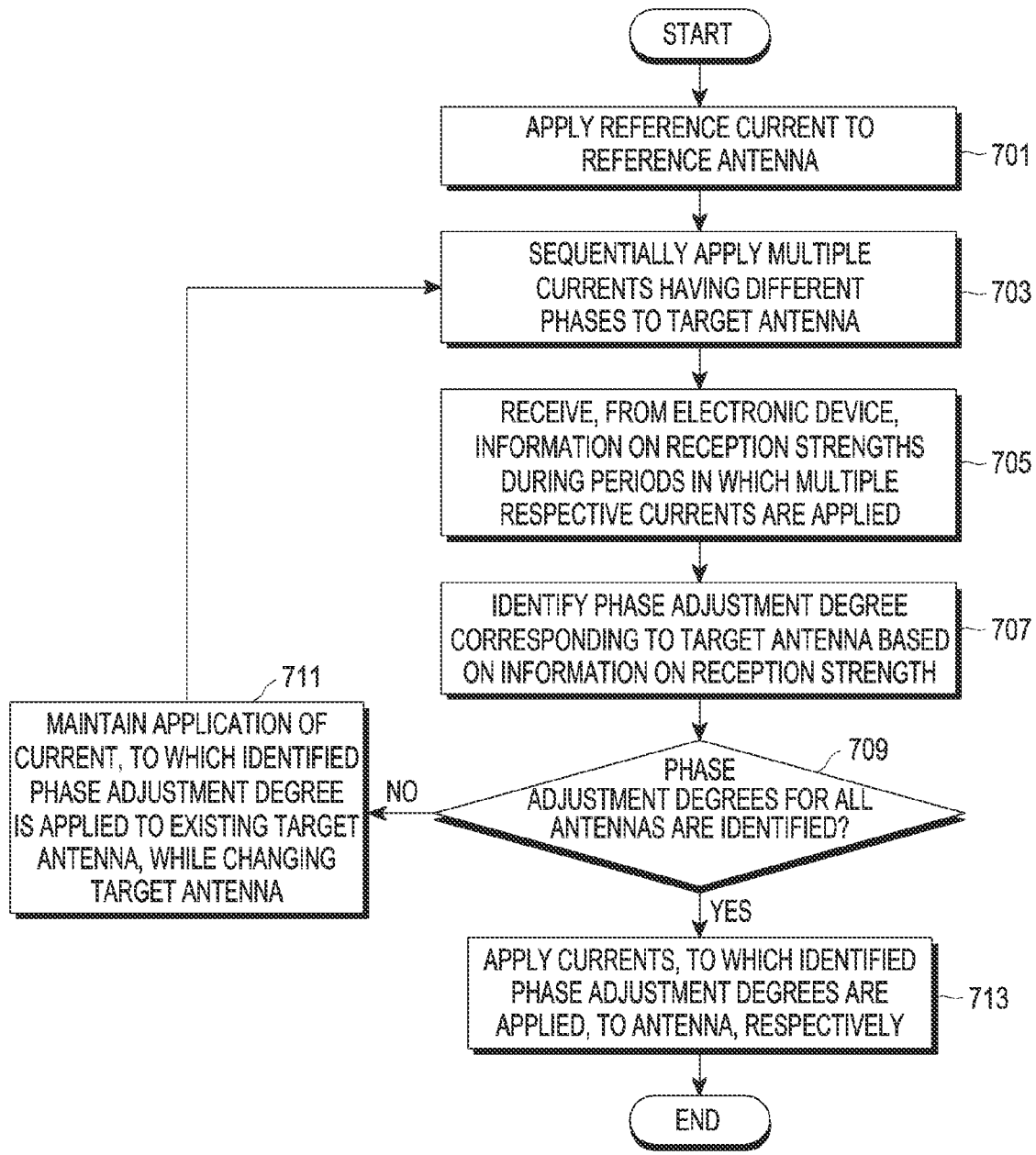
FIG. 7 is a flowchart illustrating an example method of operating a wireless power transmission device according to various embodiments.

FIG. 7 is a flowchart illustrating an example method of operating a wireless power transmission device according to various embodiments.

According to various embodiments, in operation 701, the wireless power transmission device 100 may apply a reference current to a reference antenna. In operation 703, the wireless power transmission device 100 may sequentially apply multiple currents having different phases to a target antenna. In operation 705, the wireless power transmission device 100 may receive, from the electronic device 150, information on reception strengths during periods in which multiple respective currents are applied. For example, the wireless power transmission device 100 may receive, from the electronic device 150, communication signals including the respective voltages at the output terminal of the rectifier of the electronic device 150 during application of the multiple respective currents. In operation 707, the wireless power transmission device 100 may identify the phase adjustment degree corresponding to the target antenna, based on the information on the reception strength. In operation 709, the wireless power transmission device 100 may identify whether the phase adjustment degrees for all antennas have been identified.

If it is determined that the phase adjustment degrees have not been identified for all antennas ("No" in operation 709), the wireless power transmission device 100 may maintain application of a current, to which the identified phase adjustment degree is applied, to an existing target antenna, while changing the target antenna in operation 711. If the identified phase adjustment degree for the existing target antenna is A°, the wireless power transmission device 100 may cause a phase shifter corresponding to the existing target antenna to control a phase of the input electrical signal to be A°. The wireless power transmission device 100 may control an attenuation degree of an attenuator and an adjustment degree of an amplifier, the attenuator and the amplifier corresponding to the existing target antenna, to a degree configured for charging. That is, the existing target antenna may maintain formation of an RF wave for charging. The wireless power transmission device 100 may perform an operation of identifying an optimum phase adjustment degree for a new target antenna.

If it is determined that the phase adjustment degrees for all antennas have been identified ("Yes" in operation 709), the wireless power transmission device 100 may apply currents, to which the identified phase adjustment degrees are applied, to the respective antennas in operation 713. Since the application of current is maintained for the existing target antennas, operation 713 may denote maintaining the application of the reference current to the reference antenna while maintaining the degree of phase adjustment, the degree of attenuation, and the degree of adjustment in connection with currents, applied by the wireless power transmission device 100 to the existing target antennas.

Figure 8:
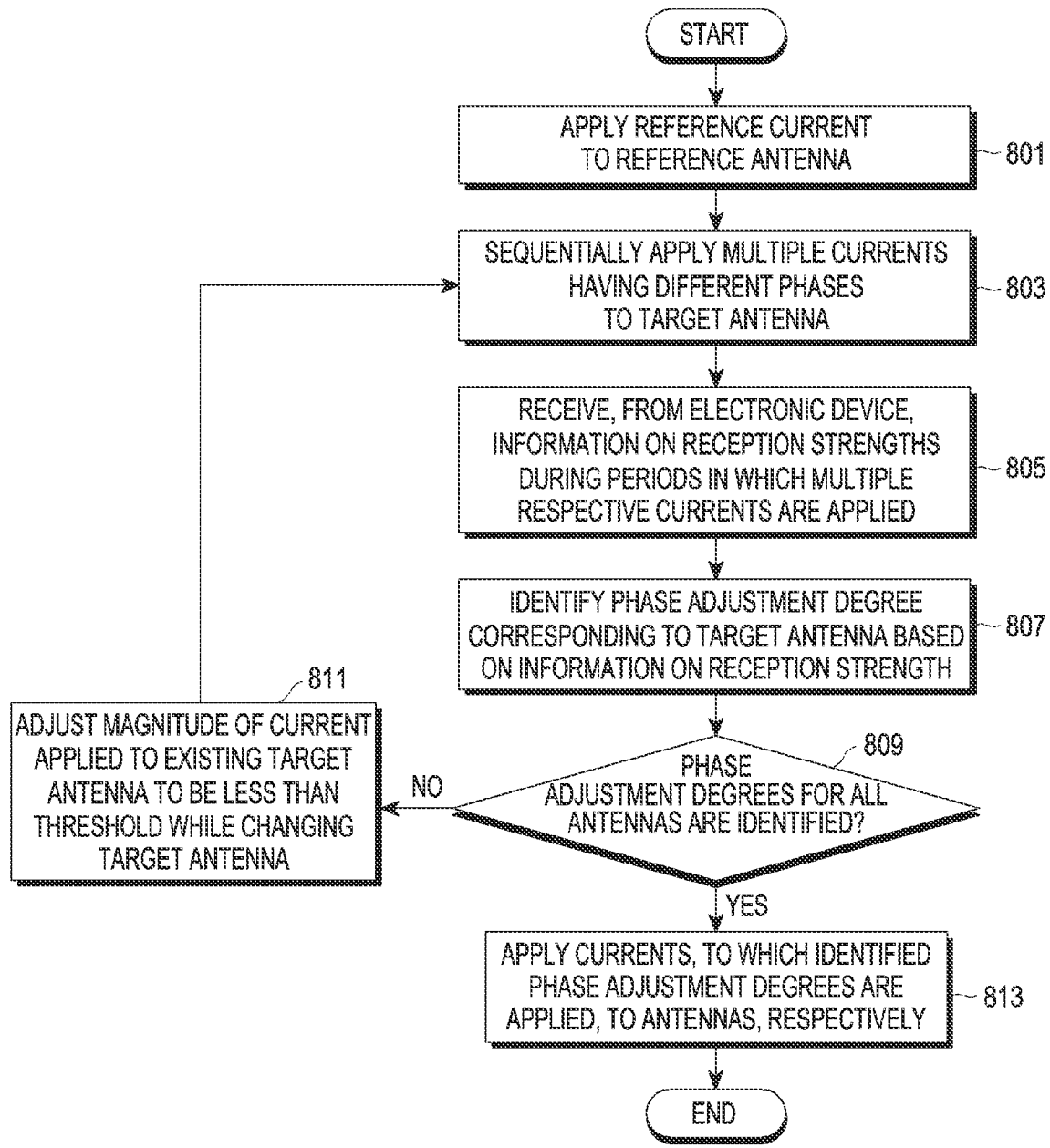
FIG. 8 is a flowchart illustrating an example method of operating a wireless power transmission device according to various embodiments.

FIG. 8 is a flowchart illustrating an example method of operating a wireless power transmission device according to various embodiments.

According to various embodiments, in operation 801, the wireless power transmission device 100 may apply a reference current to a reference antenna. In operation 803, the wireless power transmission device 100 may sequentially apply multiple currents having different phases to a target antenna. In operation 805, the wireless power transmission device 100 may receive, from the electronic device 150, information on reception strengths during periods in which multiple respective currents are applied. For example, the wireless power transmission device 100 may receive, from the electronic device 150, a communication signal including each of the voltages at the output terminal of the rectifier of the electronic device 150 while applying each of the multiple currents. In operation 807, the wireless power transmission device 100 may identify a phase adjustment degree corresponding to the target antenna based on the information on the reception strength. In operation 809, the wireless power transmission device 100 may determine whether the phase adjustment degrees have been identified for all antennas.

If it is determined that the phase adjustment degrees have not been identified for all antennas ("No" in operation 809), the wireless power transmission device 100 may adjust the magnitude of a current applied to an existing target antenna to have a value less than a threshold while changing the target antenna in operation 811. For example, the wireless power transmission device 100 may control the magnitude of a current applied to the existing target antenna to have a value less than a threshold by configuring an attenuation degree of an attenuator corresponding to the existing target antenna to be a specified value. In an embodiment, the wireless power transmission device 100 may control the magnitude of a current applied to the existing target antenna to have a value less than a threshold by controlling an adjustment degree of an amplifier corresponding to the existing target antenna. The wireless power transmission device 100 may control a phase shifter corresponding to the identified target antenna to perform adjustment based on the identified phase adjustment degree, or may control the phase shifter not to operate.

When it is determined that the phase adjustment degrees have been identified for all antennas ("Yes" in operation 809), the wireless power transmission device 100 may apply currents, to which the identified phase adjustment degrees are applied, to the antennas, respectively, in operation 813. When the wireless power transmission device 100 adjusts only the strength input to the antenna while controlling a phase shifter to perform adjustment based on the identified phase adjustment degree, the wireless power transmission device 100 may control at least one of the attenuator and the amplifier to increase the strength input to the antenna to the strength configured for charging while maintaining the phase adjustment degree due to the phase shifter. When the wireless power transmission device 100 controls the phase shifter not to operate, the wireless power transmission device 100 may control each of the phase shifters to perform adjustment of an input electrical signal based on the identified phase adjustment degree. In addition, the wireless power transmission device 100 may control at least one of an attenuator or an amplifier to increase the strength input to the antenna to the strength configured for charging. Meanwhile, the wireless power transmission device 100 may maintain application of the reference current to the reference antenna while applying currents, to which the identified phase adjustment degrees are applied, to antennas that have been configured as a target antenna.

Figure 9:
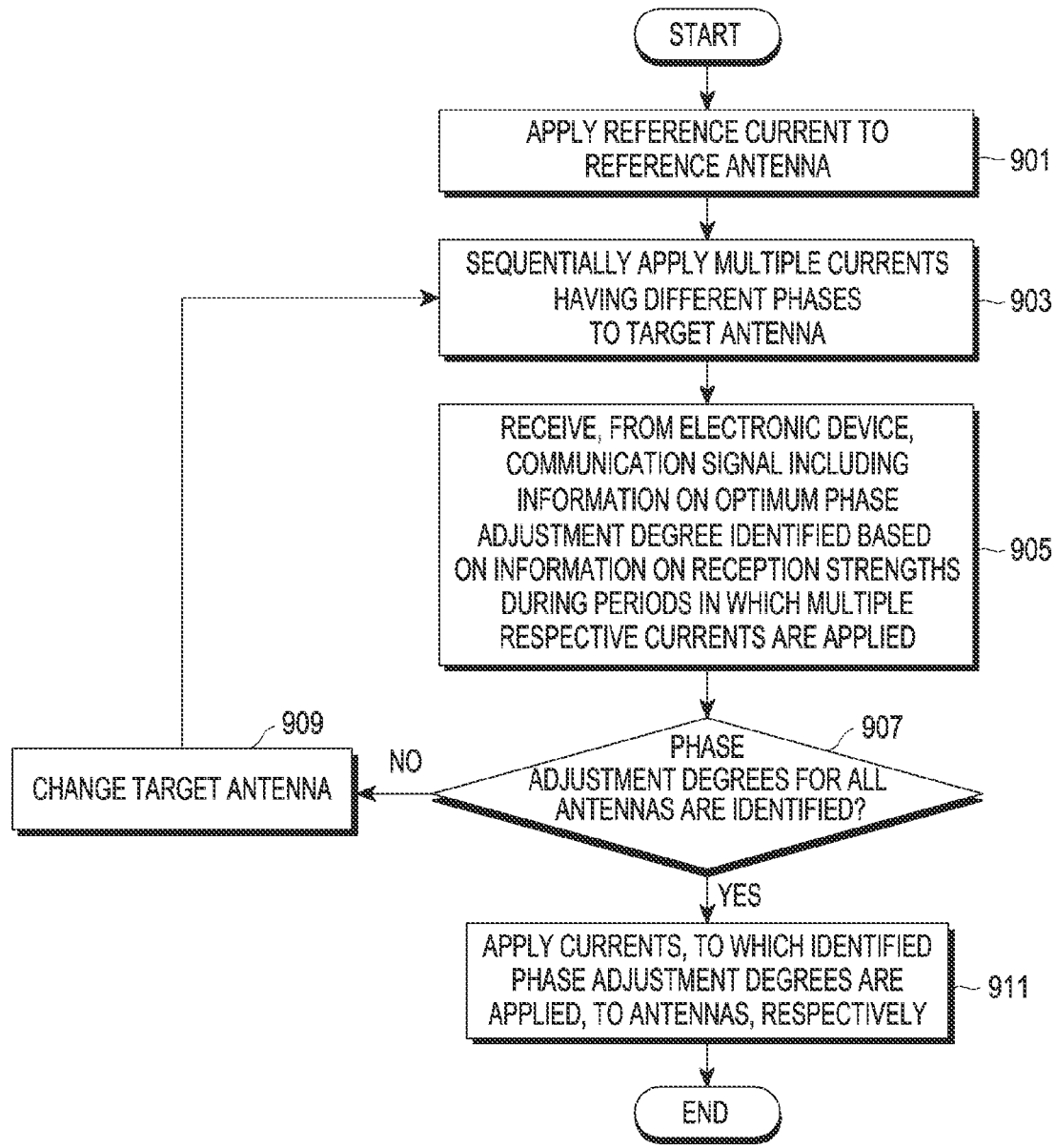
FIG. 9 is a flowchart illustrating an example method of operating a wireless power transmission device according to various embodiments.

FIG. 9 is a flowchart illustrating an example method of operating a wireless power transmission device according to various embodiments.

According to various embodiments, the wireless power transmission device 100 may apply a reference current to a reference antenna in operation 901. In operation 903, the wireless power transmission device 100 may sequentially apply multiple currents having different phases to a target antenna. For example, the wireless power transmission device 100 may apply a first current, to which a first phase adjustment degree is applied, to a target antenna during a first period of time, may apply a second current, to which a second phase adjustment degree is applied, to the target antenna during a second period of time, and may apply a third current, to which a third phase adjustment degree is applied, to the target antenna during a third period of time. In operation 905, the wireless power transmission device 100 may receive, from the electronic device 150, a communication signal including information on the optimum phase adjustment degree identified based on information on reception strengths during periods in which multiple respective currents are applied.

The electronic device 150 according to various embodiments may convert an RF wave, formed by the reference antenna and the target antenna, into an electrical signal, and may identify an optimum phase adjustment degree corresponding to the target antenna. For example, the electronic device 150 may measure a first strength that is the strength of received power during a first period of time, a second strength that is the strength of received power during a second period of time, and a third strength that is the strength of received power during a third period of time. The electronic device 150 may identify a first phase adjustment degree corresponding to the target antenna during the first period of time, a second phase adjustment degree corresponding to the target antenna during the second period of time, and a third phase adjustment degree corresponding to the target antenna during the third period of time. For example, the electronic device 150 may receive information about the first phase adjustment degree, second phase adjustment degree, and third phase adjustment degree from the wireless power transmission device 100. The electronic device 150 may receive information about the first phase adjustment degree during the first period of time, may receive information about the second phase adjustment degree during the second period of time, and may receive information about the third phase adjustment degree during the third period of time. The electronic device 150 may receive, from the wireless power transmission device 100, information about the first phase adjustment degree, second phase adjustment degree, and third phase adjustment degree, and information about the sequence of change during a predetermined time. The electronic device 150 may identify identification information of the wireless power transmission device 100, and may identify information about the first phase adjustment degree, second phase adjustment degree, and third phase adjustment degree, and information about the sequence of change based on the identification information.

For example, the electronic device 150 may identify that the second strength during the second period of time has the largest magnitude and correspondingly, may identify that the second phase adjustment degree is the optimum phase adjustment degree of the target antenna. The electronic device 150 may configure the phase adjustment degree in one dimension, and may configure the reception strength of the electronic device 150 in one dimension. The electronic device 150 may interpolate the reception strength, and may identify an optimum phase adjustment degree corresponding to the maximum value of the reception strength according to a result of interpolation. The electronic device 150 may transmit a communication signal including the identified optimum phase adjustment degree to the wireless power transmission device 100.

In operation 907, the wireless power transmission device 100 may identify whether the optimum phase adjustment degrees have been identified for all antennas. If it is determined that the optimum phase adjustment degrees have not been identified for all antennas ("No" in operation 907), the wireless power transmission device 100 may change the target antenna in operation 909. The wireless power transmission device 100 may sequentially apply electrical signals, for which multiple phase adjustment degrees are applied, to the changed target antenna, and the electronic device 150 may identify the optimum phase adjustment degree for the changed target antenna and transmit the same to the wireless power transmission device 100. The wireless power transmission device 100 may identify the optimum phase adjustment degree for each of the remaining antennas except for the reference antenna. If it is determined that the optimum phase adjustment degrees have been identified for all antennas ("Yes" in operation 907), the wireless power transmission device 100 may apply currents, to which the identified phase adjustment degrees are applied, to the respective antennas (that is, the remaining antennas except for the reference antenna) in operation 911. The wireless power transmission device 100 may apply the reference current to the reference antenna while applying currents, to which phase adjustment degrees are applied, to the remaining antennas except for the reference antenna.

Figure 10:
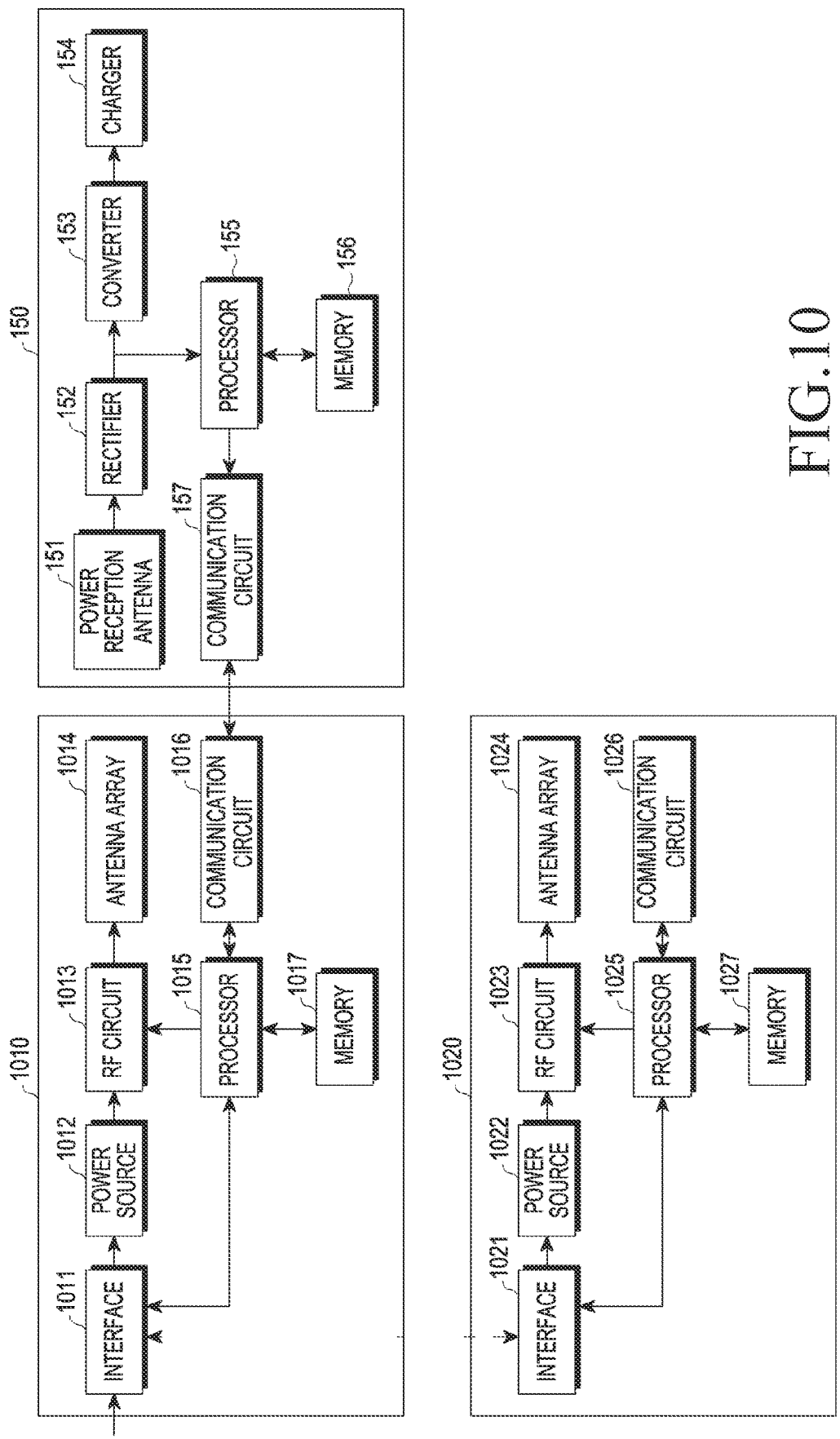
FIG. 10 is a block diagram illustrating an example configuration of a modular wireless power transmission device and an electronic device according to various embodiments.

FIG. 10 is a block diagram illustrating an example configuration of a modular wireless power transmission device and an electronic device according to various embodiments.

A first wireless power transmission device 1010 may include an interface (e.g., including interface circuitry) 1011, a power source 1012, an RF circuit 1013, an antenna array 1014, a processor (e.g., including processing circuitry) 1015, a communication circuit 1016, and a memory 1017. A second wireless power transmission device 1020 may include an interface (e.g., including interface circuitry) 1021, a power source 1022, an RF circuit 1023, an antenna array 1024, a processor (e.g., including processing circuitry) 1025, a communication circuit 1026, and a memory 1027. Since the elements of the electronic device 150 have been described in FIG. 2, further detailed descriptions thereof may not be repeated here.

The interface 1011 may include various interface circuitry and receive power from an external electronic device (or an external power source). The interface 1011 may transmit power to another wireless power transmission device (e.g., the second power transmission device 1020). The interface 1011 may be a path for data input/output. That is, power and data may be input or output through the interface 1011. The interface 1011 may be implemented in a USB type, for example, but there is no limitation as long as the interface is capable of inputting or outputting power and data. In addition, although FIG. 10 illustrates that power and data are input or output through one interface 1011, this is for ease of description, and the wireless power transmission device according to various embodiments may include a power input/output interface and data input/output interface, which are separated.

The power source 1012 may generate an electrical signal using power received from an external electronic device (or an external power source) through the interface 1011. The electrical signal generated from the power source 1012 may be transmitted to the RF circuit 1013. The RF circuit 1013 may include, for example, at least one of a phase shifter, an attenuator, or an amplifier. The processor 1015 may include various processing circuitry and control at least one of a phase adjustment degree of a phase shifter, an attenuation degree of an attenuator, and an adjustment degree of an amplifier, which are included in the RF circuit 1013. The antenna array 1014 may receive an electrical signal adjusted through the RF circuit 1013, and may form an RF wave using the electrical signal. The communication circuit 1016 may communicate with the electronic device 150. The memory 1017 may store instructions for performing an operation of the first wireless power transmission device 1010.

The second wireless power transmission device 1020 may receive power from the first wireless power transmission device 1010 through the interface 1021. The power source 1022 may generate an electrical signal using the received power. The RF circuit 1023 may adjust characteristics of an input electrical signal and output the adjusted electrical signal. In various embodiments, the processor 1015 of the first wireless power transmission device 1010 may determine control information about the RF circuit 1023 of the second wireless power transmission device 1010. The first wireless power transmission device 1010 and the second wireless power transmission device 1020 may select a master device therebetween upon connection, and the wireless power transmission device selected as the master device may control the RF circuits 1013 and 1023 of the first wireless power transmission device 1010 and the second wireless power transmission device 1020. For example, when the first wireless power transmission device 1010 is selected as the master device, the processor 1015 may control the RF circuit 1013 and the RF circuit 1023. The processor 1015 may transmit a control signal to the second wireless power transmission device 1020 through the interface 1011. In the embodiment of FIG. 10, the processor 1025 having received the control signal through the interface 1021 is shown as controlling the RF circuit 1023, but this is one embodiment, and according to an embodiment, the control signal through the interface 1021 may be directly transmitted to the RF circuit 1023. Meanwhile, the communication circuit 1026 of the wireless power transmission device (e.g., the second wireless power transmission device 1020) that is not selected as the master device may not communicate with the electronic device 150.

The processor 1015 of the master device (for example, the first wireless power transmission device 1010) may configure (e.g., identify), as a reference antenna, at least one of multiple patch antennas included in the antenna array 1014 and the antenna array 1024, and may configure (e.g., identify) one of the remaining antennas as a target antenna. As described in detail above, the processor 1015 may identify the optimum phase adjustment degree corresponding to the target antenna. The processor 1015 may identify the optimum phase adjustment degree for each target antenna while changing the target antenna. Accordingly, even if the power source 1012 and the power source 1022 are not synchronized, the electronic device 150 may wirelessly receive a relatively large magnitude of power.

When the first wireless power transmission device 1010 directly controls the RF circuit 1023 of the second wireless power transmission device 1020, the first wireless power transmission device 1010 may transmit control data to the RF circuit 1023. For example, the first wireless power transmission device 1010 may transmit daisy chain data to the RF circuit 1023. The RF circuit 1023 may include multiple phase shifters and multiple attenuators corresponding respectively to the multiple patch antennas of the antenna array 1024, as described above. When the first wireless power transmission device 1010 identifies the number of the multiple patch antennas of the antenna array 1024, the daisy-chain data bit sequence is limited to correspond to the number of the multiple patch antennas and transmitted to the RF circuit 1023. When the wireless power transmission device 1010 does not identify the number of the multiple patch antennas of the antenna array 1024, the first wireless power transmission device 1010 may transmit daisy chain data, and when feedback is received from an element corresponding to the last cell of the RF circuit 1023, the number of the multiple patch antennas of the antenna array 1024 may be identified based on the received feedback. Alternatively, the first wireless power transmission device 1010 may transmit chip select (CS) control data to the RF circuit 1023. The CS control data may include data for identification of the phase shifter and attenuator of the RF circuit 1023, and data indicating a phase adjustment degree and a degree of attenuation. When the first wireless power transmission device 1010 identifies the number of the multiple patch antennas of the antenna array 1024, the order of use may be programmed and controlled from each of the multiple patch antennas. When the wireless power transmission device 1010 does not identify the number of the multiple patch antennas of the antenna array 1024, the first wireless power transmission device 1010 may identify the number of patch antennas based on the feedback received from an element corresponding to the last cell of the RF circuit 1023.

Figure 11:
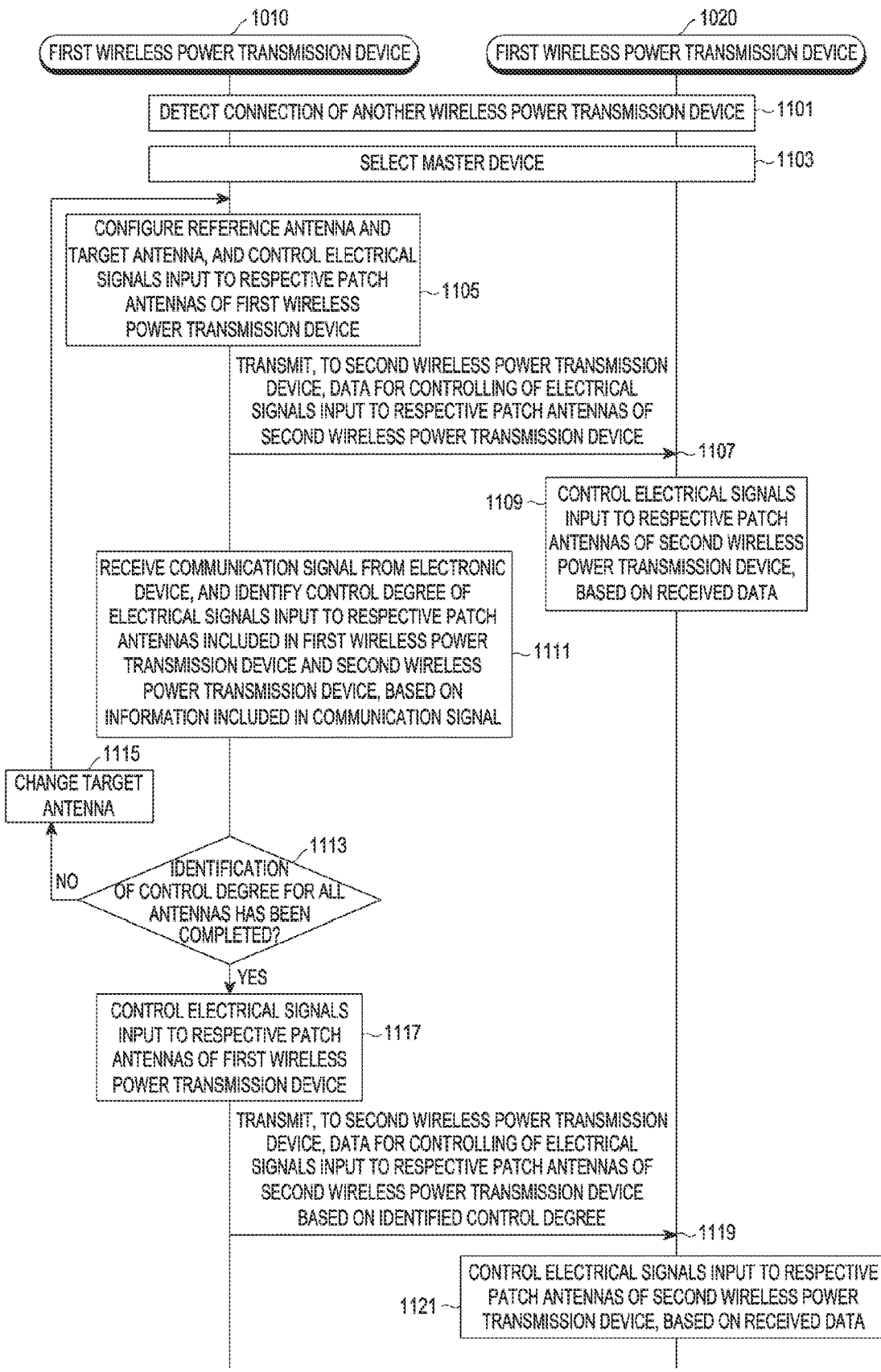
FIG. 11 is a signal flow diagram illustrating an example operation of multiple wireless power transmission devices according to various embodiments.
Figure 12A:
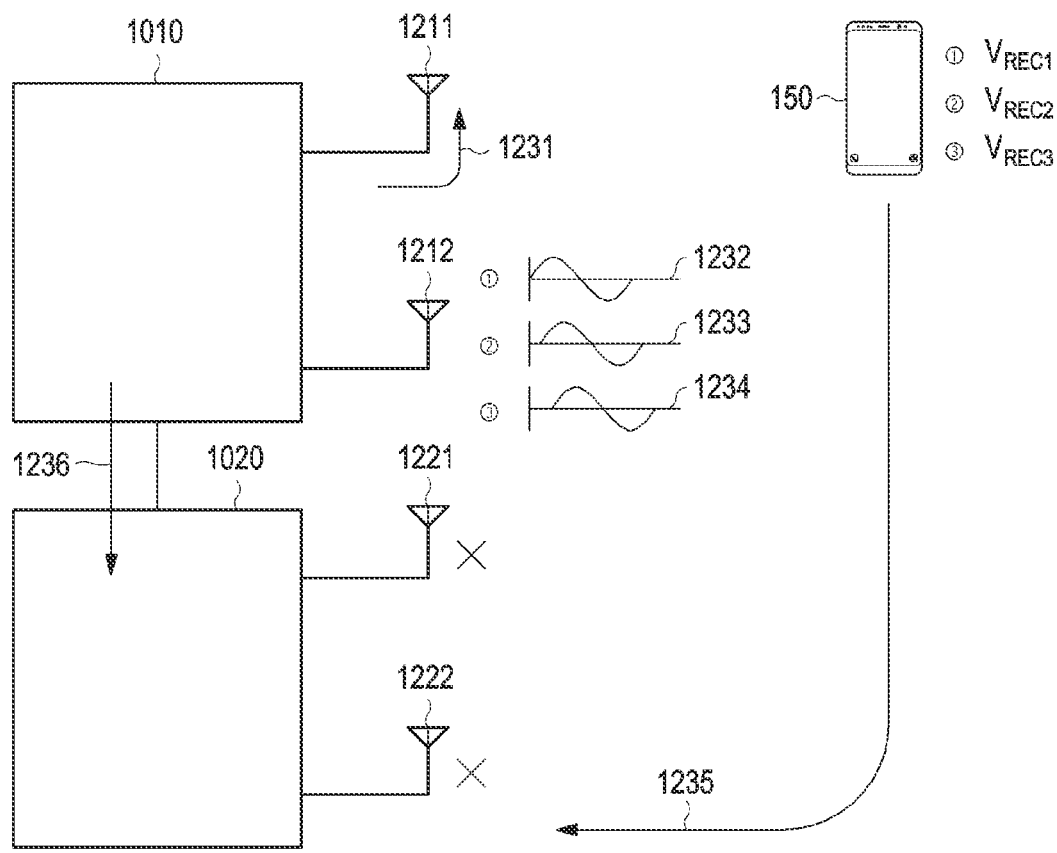
FIG. 12A is a diagram illustrating multiple wireless power transmission devices and an electronic device according to various embodiments.
Figure 12B:
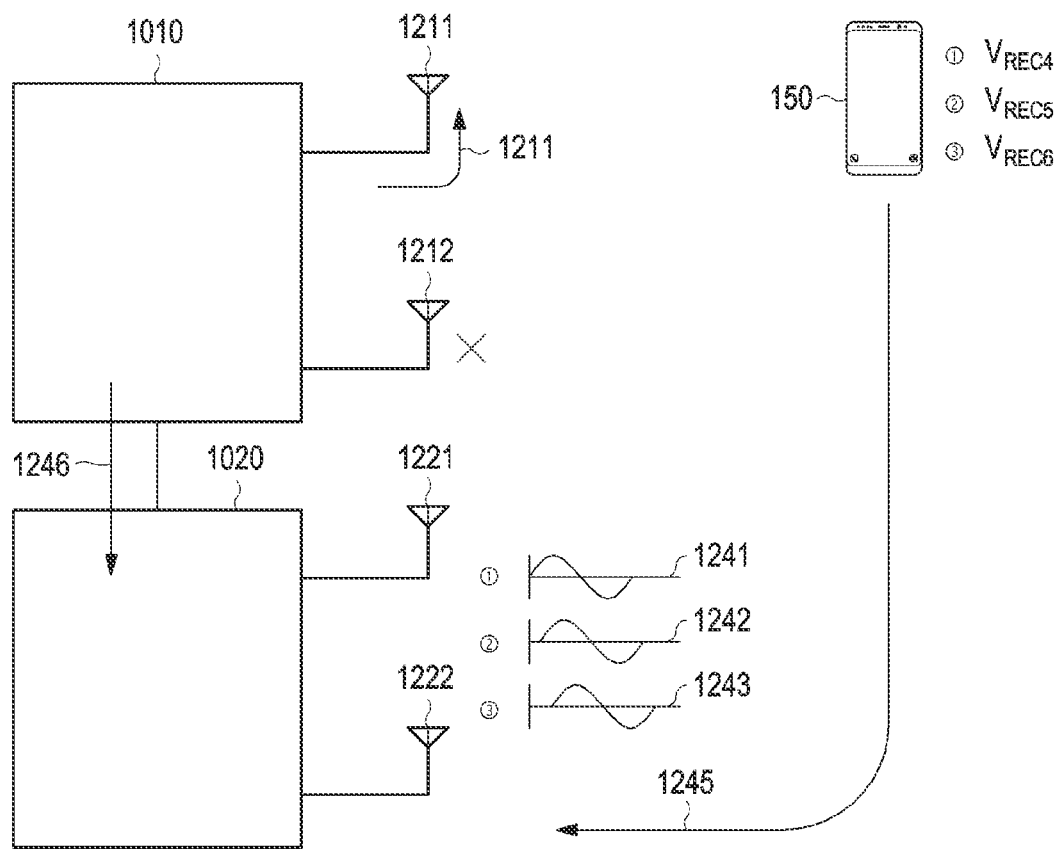
FIG. 12B is a diagram illustrating multiple wireless power transmission devices and an electronic device according to various embodiments.

FIG. 11 is a signal flow diagram illustrating an example operation of multiple wireless power transmission devices according to various embodiments. The embodiment of FIG. 11 will be described in greater detail with reference to FIGS. 12A and 12B. FIG. 12A is a diagram illustrating multiple wireless power transmission devices and an electronic device according to various embodiments. FIG. 12B is a diagram illustrating multiple wireless power transmission devices and an electronic device according to various embodiments.

According to various embodiments, the first wireless power transmission device 1010 and the second wireless power transmission device 1020 may detect a connection to another wireless power transmission device in operation 1101. For example, the first wireless power transmission device 1010 and the second wireless power transmission device 1020 may detect a connection to another wireless power transmission device based on a change of a voltage value in an interface for connection with an external device (for example, the interface 1011 or interface 1021 of FIG. 10), or whether data reception occurs. In operation 1103, the first wireless power transmission device 1010 and the second wireless power transmission device 1020 may select a master device. For example, the first wireless power transmission device 1010 may pre-establish a communication connection with the electronic device 150 for wirelessly reception of power, and based on this, the first wireless power transmission device 1010 may be selected as a master device. The first wireless power transmission device 1010 and the second wireless power transmission device 1020 may select a master device based on device capability, and there is no limitation for a method of selecting the master device. In the example illustrated in the embodiment of FIG. 11, it is assumed that the first wireless power transmission device 1010 is selected as the master device.

In operation 1105, the first wireless power transmission device 1010 may configure (e.g., identify) a reference antenna and a target antenna, and may control each of electrical signals input to each of the patch antennas of the first wireless power transmission device 1010. In the embodiment illustrated in FIG. 12A, the first wireless power transmission device 1010 may include a first antenna 1211 and a second antenna 1212, and the second wireless power transmission device 1020 may include a third antenna 1221 and a fourth antenna 1222. For example, the first wireless power transmission device 1010 may configure (e.g., identify) the first antenna 1211 as a reference antenna, and may configure (e.g., identify) the second antenna 1222 as a target antenna. The first wireless power transmission device 1010 may sequentially apply, to the second antenna 1212 that is a target antenna, a first current 1232, to which a first phase adjustment degree is applied, during a first period of time, a second current 1233, to which a second phase adjustment degree is applied, during a second period of time, and a third current 1234, to which a third phase adjustment degree is applied, during a third period of time. The first wireless power transmission device 1010 may apply the reference current 1231 to the first antenna 1211 that is a reference antenna during the first to third periods of time. On the other hand, during the first to third periods of time, a current is not applied to the third antenna 1221 and the fourth antenna 1222, which are not the target antenna, or a current having a value less than a threshold needs to be applied thereto.

In operation 1107, the first wireless power transmission device 1010 may transmit, to the second wireless power transmission device 1020, data for controlling of the electrical signals input to the respective patch antennas of the second wireless power transmission device 1020. For example, the first wireless power transmission device 1010 may transmit, to the second wireless power transmission device 1020, control data 1236 enabling a current having a value less than a threshold to be applied to the third antenna 1221 and the fourth antenna 1222 of the second wireless power transmission device 1020. For example, the first wireless power transmission device 1010 may transmit, to the second wireless power transmission device 1020, data for controlling of attenuators corresponding to the third antenna 1221 and the fourth antenna 1222. In operation 1109, the second wireless power transmission device 1020 may control, based on the received data, each of the electrical signals input to each of the patch antennas of the second wireless power transmission device 1020. The second wireless power transmission device 1020 may control the degree of attenuation of the attenuators corresponding to the third antenna 1221 and the fourth antenna 1222, based on data for controlling of the attenuators corresponding to the third antenna 1221 and the fourth antenna 1222, for example. During the first to third periods of time, the third antenna 1221 and the fourth antenna 1222 may be applied with a current having a value less than a threshold.

In operation 1111, the first wireless power transmission device 1010 may receive the communication signal 1235 from the electronic device 150, and may identify, based on information included in the communication signal, a degree of control of electrical signals input to the respective patch antennas included in the first wireless power transmission device 1010 and the second wireless power transmission device 1020. As described above, the electronic device 150 may transmit a communication signal including information on the strength of power received during the first period of time, the second period of time, and the third period of time to the first wireless power transmission device 1010, or may transmit a communication signal including an optimum phase adjustment degree to the first wireless power transmission device 1010. The first wireless power transmission device 1010 may determine, for example, an optimum phase adjustment degree of the target antenna based on information included in the communication signal.

In operation 1113, the first wireless power transmission device 1010 may identify whether identification of control degrees for all antennas has been completed. If it is identified that identification of the control degrees for all antennas has not been completed ("No" in operation 1113), the first wireless power transmission device 1010 may change the target antenna in operation 1115.

For example, as shown in FIG. 12B, the first wireless power transmission device 1010 may maintain configuration of the first antenna 1211 as the reference antenna, and may configure (e.g., identify) the third antenna 1221 of the second wireless power transmission device 1020 to be a target antenna. The first wireless power transmission device 1010 may transmit data to the second wireless power transmission device 1020 such that the fourth current 1241, to which the first phase adjustment degree is applied, is applied to the third antenna 1221 that is a target antenna during a fourth period of time, the fifth current 1242, to which the fifth phase adjustment degree is applied, is applied thereto during a fifth period of time, and the sixth current 1243, to which the sixth phase adjustment degree is applied, is applied thereto during a sixth period of time, in a sequential manner. The RF circuit 1023 of the second wireless power transmission device 1020 may adjust, by directly using data or under the control of the processor 1025 having received the data, the fourth current 1241, the fifth current 1242, and the sixth current 1243. For example, a phase shifter corresponding to the third antenna 1221 included in the RF circuit 1023 may perform adjustment of the input signal to the first phase adjustment degree during the fourth period of time, to the second phase adjustment degree during the fifth period of time, and to the third phase adjustment degree during the sixth period of time. In addition, the first wireless power transmission device 1010 may transmit data to the second wireless power transmission device 1020 such that a current having a value less than a threshold is applied to the fourth antenna 1222 during the fourth, the fifth, and the sixth periods of time. The data may be, for example, control data enabling that an attenuator corresponding to the fourth antenna 1222 attenuates the magnitude of the current input to have a value less than a threshold. Data 1246 for controlling of a current input to the third antenna 1221 and the fourth antenna 1222 may be sequentially or simultaneously transmitted to the second wireless power transmission device 1020. Meanwhile, the first wireless power transmission device 1010 may apply the reference current 1231 to the first antenna 1211 that is a reference antenna during the fourth to sixth periods of time. The first wireless power transmission device 1010 may apply a current, to which the identified optimum phase adjustment degree is applied, to the second antenna 1212 or may not perform phase adjustment. The first wireless power transmission device 1010 may apply a current having a strength for charging to the second antenna 1212, or may apply a current having a strength less than a threshold to the second antenna 1212.

The first wireless power transmission device 1010 may receive a communication signal 1245 from the electronic device 150, and the first wireless power transmission device 1010 may identify, based on the information included in the communication signal 1245, for example, the optimum phase adjustment degree of the third antenna 1221 that is the target antenna.

Referring to FIG. 11 again, if it is determined that control degrees for all antennas have been identified ("Yes" in operation 1113), the first wireless power transmission device 1010 may control an electrical signal input to each of the patch antennas included in the first wireless power transmission device 1010 based on the identified control degree, in operation 1117. In operation 1119, the first wireless power transmission device 1010 may transmit, to the second wireless power transmission device 1020, data for controlling of the electrical signals input to the respective patch antennas of the second wireless power transmission device 1020 based on the identified control degree. In operation 1121, the second wireless power transmission device 1020 may control electrical signals input to the respective patch antennas of the second wireless power transmission device 1020, based on the received data.

The first wireless power transmission device 1010 may apply a reference current 1211 to the first antenna 1231, which is a reference antenna, and may control the RF circuit 1013 to apply currents, for which adjustments of the optimum phase adjustment degrees are performed, to the remaining antennas 1212, respectively. The first wireless power transmission device 1010 may transmit, to the second wireless power transmission device 1020, control data for adjustment of the input current to the optimum phase adjustment degrees corresponding respectively to the third antenna 1221 and the fourth antenna 1222. A phase shifter corresponding to the third antenna 1221 included in the RF circuit 1023 and a phase shifter corresponding to the fourth antenna 1222 included therein may adjust phases of input currents to the optimum phase adjustment degrees corresponding respectively to the third antenna 1221 and the fourth antenna 1222, using the received control data or under the control of the processor 1025.

Figure 13:
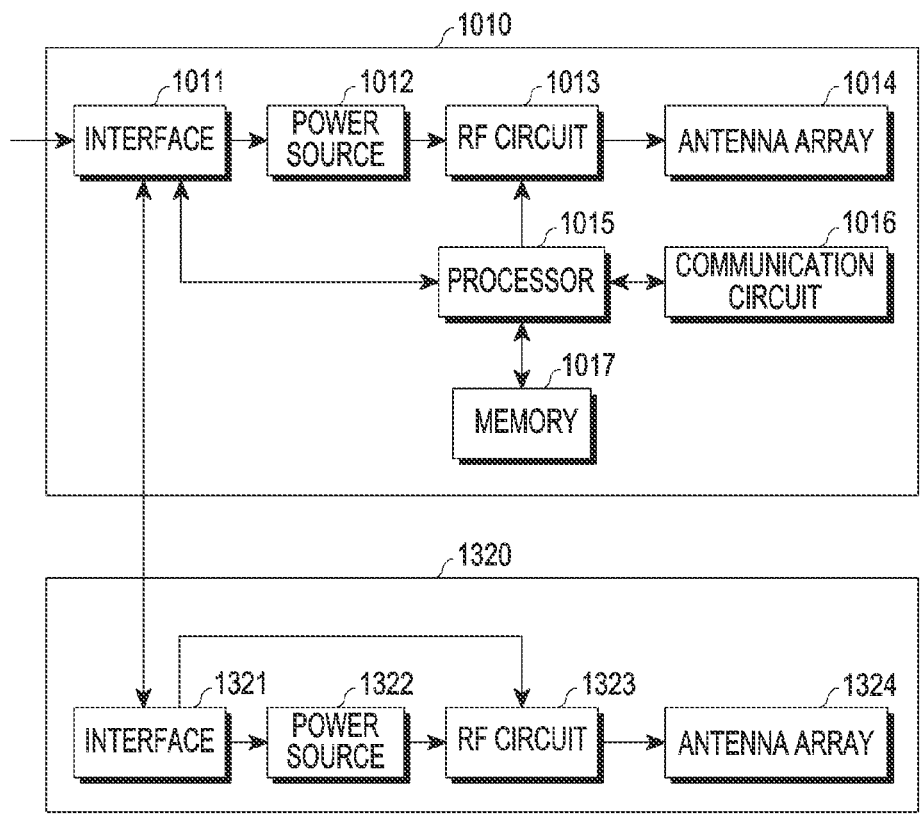
FIG. 13 is a block diagram illustrating example multiple wireless power transmission devices according to various embodiments.

FIG. 13 is a block diagram illustrating example multiple wireless power transmission devices according to various embodiments.

The first wireless power transmission device 1010 may be connected to a third wireless power transmission device 1320. The third wireless power transmission device 1320 may include an interface (e.g., including interface circuitry) 1321, a power source 1322, an RF circuit 1323, and an antenna array 1324. The first wireless power transmission device 1010 may detect a connection of the third wireless power transmission device 1320, and may identify information on the third wireless power transmission device 1320.

For example, the first wireless power transmission device 1010 may identify identification information of the third wireless power transmission device 1320, and may identify information on the number of patch antennas included in the antenna array 1324 of the third wireless power transmission device 1320, based on the identification information. The first wireless power transmission device 1010 may transmit daisy-scheme data or chip select-scheme data, described in the above, to the RF circuit 1323 through the interface 1010 and the interface 1321. Each of a phase shifter and an attenuator in the RF circuit 1323 may operate based on the received data. In various embodiments, the processor 1015 may configure (e.g., identify) at least a part of the antenna array 1014 and the antenna array 1324 as a reference antenna, and determine an optimum phase adjustment degree for each target antenna while changing the target antenna. The processor 1015 may control the RF circuit 1013 and the RF circuit 1323 to enable currents, to which the determined optimum phase adjustment degrees are applied, to be applied to the respective patch antennas of the antenna array 1014 and the antenna array 1324. Accordingly, even when the power source 1012 and the power source 1322 are not synchronized, the electronic device 150 may wirelessly receive a relatively large magnitude of power.

Figure 14A:
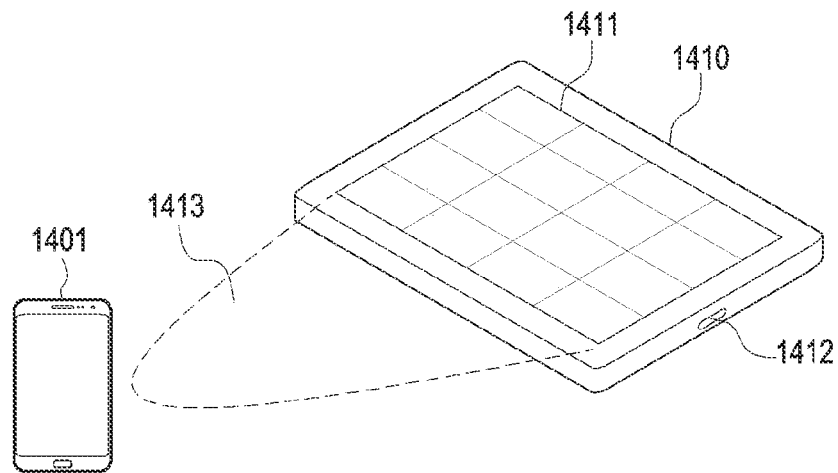
FIG. 14A is a diagram illustrating an example wireless power transmission device and an electronic device according to various embodiments.
Figure 14B:
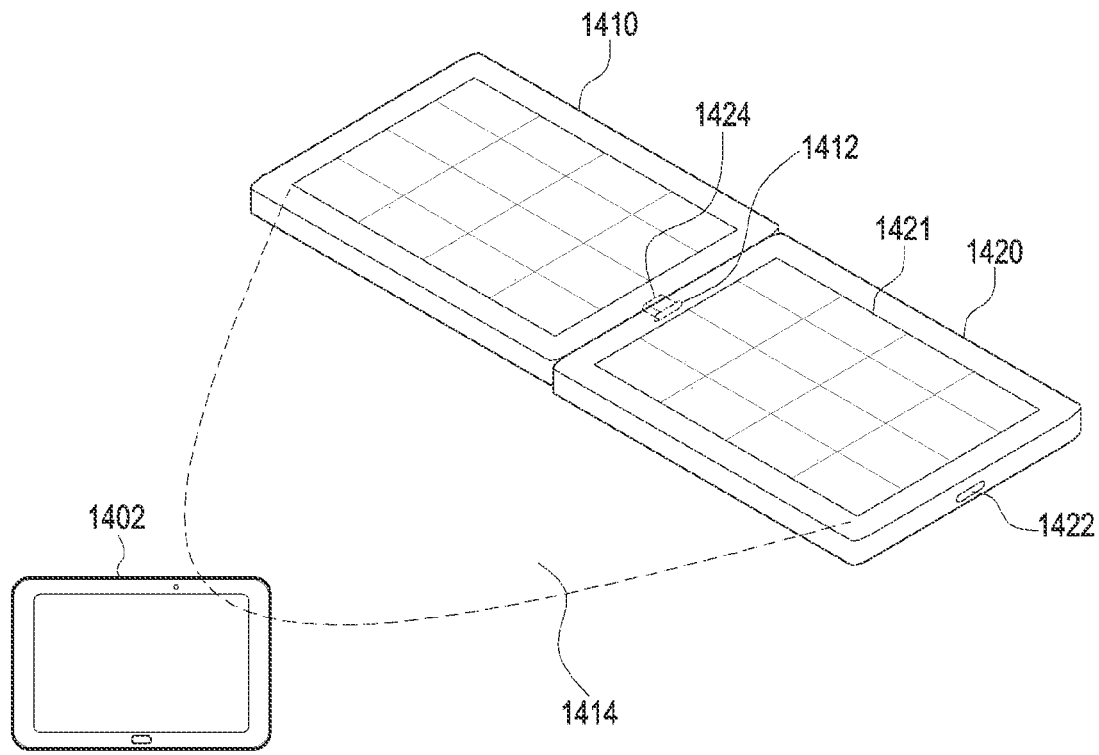
FIG. 14B is a diagram illustrating an example wireless power transmission device and an electronic device according to various embodiments.

FIG. 14A is a diagram illustrating an example wireless power transmission device and an electronic device according to various embodiments. FIG. 14B is a diagram illustrating an example wireless power transmission device and an electronic device according to various embodiments.

Referring to FIG. 14A, a first wireless power transmission device 1410 may include an antenna array 1411 and an interface (e.g., including interface circuitry) 1412. An RF wave 1413 may be formed by the antenna array 1411, and the electronic device 1401 may convert the RF wave 1413 into an electrical signal and use the same. The antenna array 1411 may be exposed to the outside, or may be disposed within the housing of the first wireless power transmission device 1410 according to an embodiment. When there is a need to charge a large-capacity electronic device 1402, a user may connect the second wireless power transmission device 1420 to the first wireless power transmission device 1410 as shown in FIG. 14B. The second wireless power transmission device 1420 may include an interface (e.g., including interface circuitry) 1424 for connection with the first wireless power transmission device 1420 and an interface (e.g., including interface circuitry) 1422 for connection with another wireless power transmission device. The interface 1424 is shown in as being insertable into the interface 1412, but there are no restrictions on the implementation form and method. The first wireless power transmission device 1410 and the second wireless power transmission device 1420 according to various embodiments may further include physical coupling means for coupling with each other. The antenna array 1411 of the first wireless power transmission device 1410 and the antenna array 1421 of the second wireless power transmission device 1420 may form an RF wave 1414, and the large-capacity electronic device 1402 may convert the RF wave 1414 into an electrical signal and use the same. If necessary, the user may move the second wireless power transmission device 1420 to another location to perform wireless charging at the corresponding location.

Figure 15:
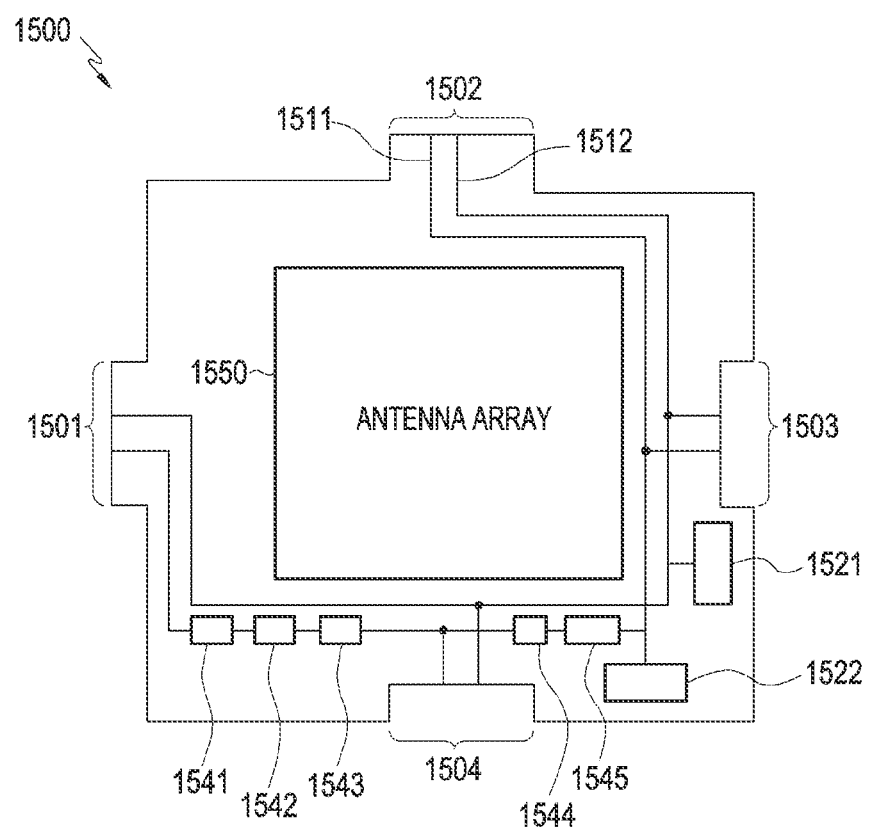
FIG. 15 is a diagram illustrating an example wireless power transmission device according to various embodiments.

FIG. 15 is a diagram illustrating an example wireless power transmission device according to various embodiments.

Referring to FIG. 15, a wireless power transmission device 1500 may include protrusions 1501 and 1502 and depressions 1503 and 1504. The protrusions 1501 and 1502 may have a shape capable of being combined with depressions of another wireless power transmission device. A data line 1511 and a power line 1512 may be connected to the protrusions 1501 and 1502 and the depressions 1503 and 1504. The power line 1512 may be connected to a power interface 1521. The power interface 1521 may be connected to an outlet for connection to an external power source. The processor 1522 may transmit control data to multiple elements (e.g., at least one of a phase shifter and an attenuator) respectively connected to the multiple patch antennas of an antenna array 1550. The wireless power transmission device 1500 may include one or more selection modules (e.g., including various circuitry) 1541, 1542, 1543, and 1544 and an expander module 1545 for receiving control data from the processor 1522 and transmitting the control data to the corresponding element. The expander module 1545 may transmit the control data from the processor 1522 to one or more selection modules 1541, 1542, 1543, and 1544. The one or more selection modules 1541, 1542, 1543, and 1544 may transmit the received control data to a corresponding RF element (e.g., a phase shifter). The one or more selection modules 1541, 1542, 1543, and 1544 may identify chip selection information in the control data, and may transmit the control information to an RF element corresponding to the chip selection information. Accordingly, the RF element may adjust an input electrical signal based on the control information.

In addition, the power line 1512 may be connected to a power source (not shown), and an electrical signal from the power source may be provided to at least one element.

Figure 16:
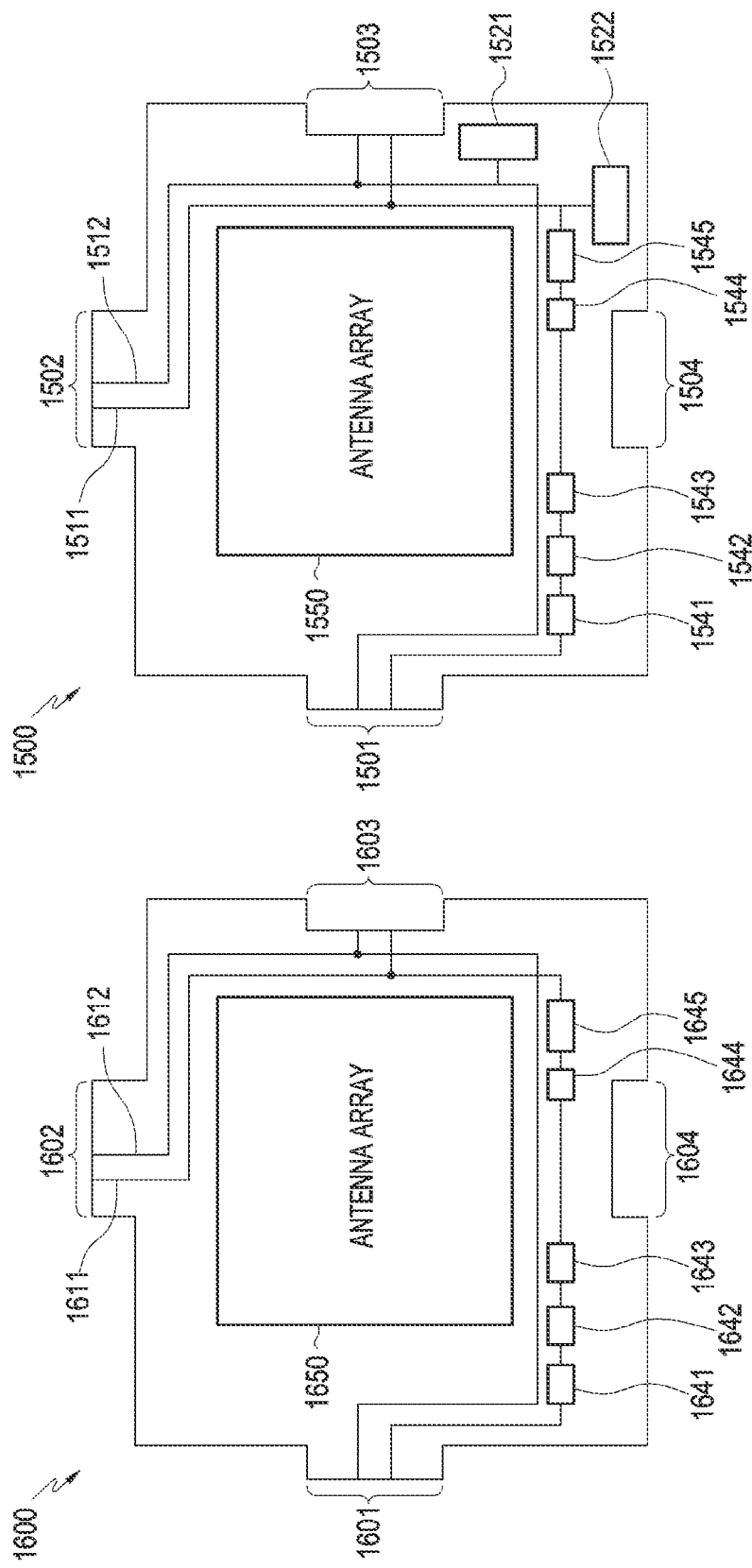
FIG. 16 is a diagram illustrating an example wireless power transmission device according to various embodiments.

FIG. 16 is a diagram illustrating an example wireless power transmission device according to various embodiments.

Referring to FIG. 16, another wireless power transmission device 1600 may be connected to the wireless power transmission device 1500. The other wireless power transmission device 1600 may include protrusions 1601 and 1602 and depressions 1603 and 1604. For example, the protrusion 1501 of the wireless power transmission device 1500 may be connected to the depression 1603 of the other wireless power transmission device 1600. The data line 1511 of the wireless power transmission device 1500 may be connected to a data line 1611 of the other wireless power transmission device 1600, and the power line 1512 of the wireless power transmission device 1500 may be connected to a power line 1612 of the other wireless power transmission device 1600.

Accordingly, power, which is received by the wireless power transmission device 1500 through the power interface 1521, may be transmitted to a power source of the other wireless power transmission device 1600 through the power line 1511 and the power line 1611. The power source of the other wireless power transmission device 1600 may generate an electrical signal using the received power. Control data from the processor 1522 of the wireless power transmission device 1500 may be transmitted to an expander module 1645 through the data line 1511 and the data line 1611. The control data may be transmitted to one or more selection modules 1641, 1642, 1643, and 1644 through the expansion module 1645, and the one or more selection modules 1641, 1642, 1643, and 1644 may transmit the control data to a corresponding RF element (e.g., a phase shifter). The one or more selection modules 1641, 1642, 1643, and 1644 may identify chip selection information included in the control data to identify an RF element corresponding thereto, and transmit the control information to the identified RF element. Accordingly, the RF element may adjust an input electrical signal based on the control information.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A first wireless power transmission device comprising:
   a first power source;
   a plurality of first patch antennas;
   a first RF circuit configured to adjust at least one of a phase or an amplitude of each of a plurality of first electrical signals received from the first power source, and output the plurality of first electrical signals of the adjusted phase or amplitude to the plurality of first patch antennas respectively;

a first interface comprising circuitry configured to transmit at least one of power or control data to a second wireless power transmission device comprising a second power source, a second RF circuit, and a plurality of second patch antennas, wherein the first interface of the first wireless power transmission device is physically connected to a second interface of the second wireless power transmission device, and the second interface includes circuitry configured to receive the at least one of power or control data from the first wireless power transmission device;

a communication circuit configured to communicate with an electronic device configured to wirelessly receive power; and a processor, wherein the processor is configured to:

detect, based on a change of a voltage value in the first interface, a connection with the second wireless power transmission device, select, as a master device, the first wireless power transmission device among the first wireless power transmission device and the second wireless power transmission device, based on a pre-established communication connection between the electronic device and the first wireless power transmission device, identify, as a reference antenna, one of the plurality of first patch antennas, and cause the first RF circuit to be controlled to apply a reference current to the reference antenna, control the first wireless power transmission device to transmit first control data to the second wireless power transmission device through the first interface while controlling the first RF circuit, wherein the first control data is for the second RF circuit to adjust at least one of a phase or an amplitude of each of a plurality of second electrical signals received from the second power source, based on the first control data, control the communication circuit to receive at least one communication signal from the electronic device configured to convert RF waves formed from the plurality of first patch antennas and the plurality of second patch antennas into electrical signals, identify a first optimum phase adjustment degree of the first RF circuit and a second optimum phase adjustment degree of the second RF circuit based on information included in each of the at least one communication signal, and control the first wireless power transmission device to transmit second control data to the second wireless power transmission device through the first interface, while controlling the first RF circuit to control an input electrical signal to the first optimum phase adjustment degree, wherein the second control data is for the second RF circuit to control an electrical signal input to the second wireless power transmission device to the second optimum phase adjustment degree.

2. The first wireless power transmission device of claim 1, wherein the processor is configured to, as at least a part of controlling the first wireless power transmission device to transmit the first control data to the second wireless power transmission device through the first interface while controlling the first RF circuit:

identify, as a target antenna, one of remaining antennas among the plurality of first patch antennas and the plurality of second patch antennas, and cause a phase shifter corresponding to the target antenna to be controlled to sequentially apply electrical signals having a plurality of phases to the target antenna.

3. The first wireless power transmission device of claim 2, wherein the processor is configured to, as at least a part of causing the phase shifter corresponding to the target antenna to be controlled to sequentially apply the electrical signals having the plurality of phases to the target antenna:

perform at least one operation for causing at least one attenuator corresponding to at least one antenna respectively to be controlled to apply a current having a value less than a threshold to each of the at least one antenna other than the target antenna and the reference antenna among the plurality of first patch antennas and the plurality of second patch antennas.

4. The first wireless power transmission device of claim 2, wherein the processor is configured to, as at least a part of identifying the first optimum phase adjustment degree of the first RF circuit and the second optimum phase adjustment degree of the second RF circuit:

control the communication circuit to receive, from the electronic device, at least one first communication signal including information indicating each of strengths of power received by the electronic device during each of periods in which the electrical signals having the plurality of phases are sequentially applied, and identify an optimum phase adjustment degree corresponding to the target antenna based on the information indicating each of the strengths of the power received by the electronic device during each of the periods in which the electrical signals having the plurality of phases are sequentially applied.

5. The first wireless power transmission device of claim 4, wherein the processor is configured to identify an optimum phase adjustment degree of each of the remaining antennas other than the reference antenna among the plurality of first patch antennas and the plurality of second patch antennas while changing the target antenna to another antenna until optimum phase adjustment degrees for all of the remaining antennas are identified.

6. The first wireless power transmission device of claim 5, wherein the processor is configured to, as at least a part of identifying the first optimum phase adjustment degree of the first RF circuit and the second optimum phase adjustment degree of the second RF circuit:

cause the first RF circuit or the second RF circuit to be controlled to sequentially apply the electrical signals having the plurality of phases to the changed target antenna, and cause the first RF circuit or the second RF circuit to be controlled to apply a current, to which an optimum phase adjustment degree corresponding to an original target antenna is applied, to the original target antenna for which the optimum phase adjustment degree is identified.

7. The first wireless power transmission device of claim 5, wherein the processor is configured to, as at least a part of identifying the first optimum phase adjustment degree of the first RF circuit and the second optimum phase adjustment degree of the second RF circuit:

cause the first RF circuit or the second RF circuit to be controlled to sequentially apply the electrical signals having the plurality of phases to a changed target antenna, and cause the first RF circuit or the second RF circuit to be controlled to apply a current having a magnitude less than a threshold to an original target antenna for which the optimum phase adjustment degree is identified.

8. The first wireless power transmission device of claim 2, wherein the processor is configured to, as at least a part of identifying the first optimum phase adjustment degree of the first RF circuit and the second optimum phase adjustment degree of the second RF circuit:
control the communication circuit to receive, from the electronic device, at least one second communication signal including an optimum phase adjustment degree corresponding to the target antenna, identified based on information indicating each of strengths of power received by the electronic device, during each of periods in which the electrical signals having the plurality of phases are sequentially applied, and
identify the optimum phase adjustment degree corresponding to the target antenna based on information included in the at least one second communication signal.

9. The first wireless power transmission device of claim 8, wherein the processor is configured to, as at least a part of identifying the first optimum phase adjustment degree of the first RF circuit and the second optimum phase adjustment degree of the second RF circuit:
identify an optimum phase adjustment degree of each of the remaining antennas other than the reference antenna among the plurality of first patch antennas and the plurality of second patch antennas while changing the target antenna to another antenna until optimum phase adjustment degrees for all of the remaining antennas are identified.

10. A method for operating a first wireless power transmission device comprising a first power source, a plurality of first patch antennas, a first RF circuit connected to the first power source and the plurality of first patch antennas, a communication circuit configured to communicate with an electronic device configured to wirelessly receive power, a first interface comprising interface circuitry, and a processor, the method comprising:
detecting, based on a change of a voltage value in the first interface, a connection with a second wireless power transmission device comprising a second power source, a second RF circuit, and a plurality of second patch antennas through the first interface;
based on detection of the connection, selecting, as a master device, the first wireless power transmission device among the first wireless power transmission device and the second wireless power transmission device, based on a pre-established communication connection between the electronic device and the first wireless power transmission device,
controlling the first RF circuit to adjust at least one of a phase or an amplitude of each of a plurality of first electrical signals received from the first power source, and output the plurality of first electrical signals of the adjusted phase or amplitude to the plurality of first patch antennas respectively;
transmitting first control data to the second wireless power transmission device through the first interface while controlling the first RF circuit, wherein the first control data is for the second RF circuit to adjust at least one of a phase or an amplitude of each of a plurality of second electrical signals received from the second power source, based on the first control data, wherein controlling the first RF circuit includes identifying, as a reference antenna, one of the plurality of first patch antennas, and causing the first RF circuit to be controlled to apply a reference current to the reference antenna;
controlling the communication circuit to receive at least one communication signal from the electronic device configured to convert RF waves, formed from the plurality of first patch antennas and the plurality of second patch antennas, into electrical signals;
identifying a first optimum phase adjustment degree of the first RF circuit and a second optimum phase adjustment degree of the second RF circuit, based on information included in each of the at least one communication signal; and
transmitting second control data to the second wireless power transmission device through the first interface, while controlling the first RF circuit to control an input electrical signal to the first optimum phase adjustment degree, wherein the second control data is for the second RF circuit to control an electrical signal input to the second wireless power transmission device to the second optimum phase adjustment degree.

11. The method of claim 10, wherein the transmitting of the first control data to the second wireless power transmission device through the first interface while controlling the first RF circuit comprises:
identifying, as a target antenna, one of remaining antennas among the plurality of first patch antennas and the plurality of second patch antennas, and controlling a phase shifter corresponding to the target antenna to be controlled to sequentially apply electrical signals having a plurality of phases to the target antenna.

12. The method of claim 11, wherein the causing of the phase shifter corresponding to the target antenna to be controlled to sequentially apply the electrical signals having the plurality of phases to the target antenna comprises:
performing at least one operation for causing at least one attenuator corresponding to the at least one antenna respectively to be controlled to apply a current having a value less than a threshold to each of the at least one antenna other than the target antenna and the reference antenna among the plurality of first patch antennas and the plurality of second patch antennas.

13. The method of claim 11, wherein the identifying of the first optimum phase adjustment degree of the first RF circuit and the second optimum phase adjustment degree of the second RF circuit comprises:
controlling the communication circuit to receive, from the electronic device, at least one first communication signal including information indicating each of strengths of power received by the electronic device during each of periods in which the electrical signals having the plurality of phases are sequentially applied; and
identifying an optimum phase adjustment degree corresponding to the target antenna based on the information indicating each of the strengths of the power received by the electronic device during each of the periods in which the electrical signals having the plurality of phases are sequentially applied.

14. The method of claim 13, further comprising:
identifying an optimum phase adjustment degree of each of the remaining antennas other than the reference antenna among the plurality of first patch antennas and the plurality of second patch antennas while changing the target antenna to another antenna until optimum phase adjustment degrees for all of the remaining antennas are identified.

15. The method of claim 14, wherein the identifying of the first optimum phase adjustment degree of the first RF circuit and the second optimum phase adjustment degree of the second RF circuit comprises:

causing the first RF circuit or the second RF circuit to be controlled to sequentially apply the electrical signals having the plurality of phases to the changed target antenna; and causing the first RF circuit or the second RF circuit to be controlled to apply a current, to which an optimum phase adjustment degree corresponding to an original target antenna is applied, to the original target antenna for which the optimum phase adjustment degree is identified.

16. The method of claim 14, wherein the identifying of the first optimum phase adjustment degree of the first RF circuit and the second optimum phase adjustment degree of the second RF circuit comprises:

causing the first RF circuit or the second RF circuit to be controlled to sequentially apply the electrical signals having the plurality of phases to a changed target antenna; and causing the first RF circuit or the second RF circuit to be controlled to apply a current having a magnitude less than a threshold to an original target antenna for which the optimum phase adjustment degree is identified.

17. The method of claim 11, wherein the identifying of the first optimum phase adjustment degree of the first RF circuit and the second optimum phase adjustment degree of the second RF circuit comprises:

controlling the communication circuit to receive, from the electronic device, at least one second communication signal including an optimum phase adjustment degree corresponding to the target antenna, identified based on information indicating each of strengths of power received by the electronic device, during each of periods in which the electrical signals having the plurality of phases are sequentially applied, and identifying the optimum phase adjustment degree corresponding to the target antenna based on information included in the at least one second communication signal.

18. The method of claim 17, wherein the identifying of the first optimum phase adjustment degree of the first RF circuit and the second optimum phase adjustment degree of the second RF circuit comprises:

identifying an optimum phase adjustment degree of each of the remaining antennas other than the reference antenna among the plurality of first patch antennas and the plurality of second patch antennas while changing the target antenna to another antenna until optimum phase adjustment degrees for all of the remaining antennas are identified.

* * * * *